US012621359B2

(12) United States Patent
Kuo et al.

(10) Patent No.: US 12,621,359 B2
(45) Date of Patent: May 5, 2026

(54) METHODS, SYSTEMS, ARTICLES OF MANUFACTURE, AND APPARATUS TO FACILITATE MULTI-PARTICIPANT CONVERSATION

(71) Applicant: Intel Corporation, Santa Clara, CA (US)

(72) Inventors: Chia-Hung S. Kuo, Folsom, CA (US); Stanley Baran, Chandler, AZ (US); Atsuo Kuwahara, Novi, MI (US); David Browning, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/848,194

(22) Filed: Jun. 23, 2022

(65) Prior Publication Data

US 2022/0321622 A1 Oct. 6, 2022

(51) Int. Cl.
| | |
|---|---|
| *H04L 65/403* | (2022.01) |
| *G10L 15/26* | (2006.01) |
| *G10L 25/78* | (2013.01) |
| *H04S 7/00* | (2006.01) |

(52) U.S. Cl.
CPC .......... *H04L 65/4046* (2013.01); *G10L 15/26* (2013.01); *G10L 25/78* (2013.01); *H04S 7/30* (2013.01)

(58) Field of Classification Search
CPC ............ H04L 12/1822; H04L 12/1818; H04M 3/566; H04M 2203/2011
See application file for complete search history.

(56) References Cited

U.S. PATENT DOCUMENTS

| | | | | |
|---|---|---|---|---|
| 11,095,766 | B2 * | 8/2021 | Coffman ............... | C08F 232/08 |
| 11,483,271 | B2 * | 10/2022 | Weinberg ............... | H04L 67/55 |
| 12,341,621 | B1 * | 6/2025 | Yu ........................ | H04L 12/1818 |
| 2014/0003595 | A1 * | 1/2014 | Beerse .................. | H04M 3/566 |
| | | | | 379/201.02 |
| 2015/0030149 | A1 * | 1/2015 | Chu ...................... | H04M 3/568 |
| | | | | 379/202.01 |

(Continued)

OTHER PUBLICATIONS

Davidson et al., "VoIP: An In-Depth Analysis," Cisco Press, Retrieved from [https://www.ciscopress.com/articles/printerfriendly/606583] on Jun. 21, 2022, Oct. 20, 2006, 15 pages.

(Continued)

*Primary Examiner* — Mahran Y Abu Roumi
(74) *Attorney, Agent, or Firm* — Hanley, Flight & Zimmerman, LLC

(57) ABSTRACT

Methods, apparatus, systems, and articles of manufacture are disclosed to facilitate multi participant conversation. An example apparatus to control interruptions includes at least one memory, machine readable instructions, and processor circuitry to at least one of instantiate or execute the machine readable instructions to detect first audio from a first user device, detect second audio from a second user device, determine the second detected audio is an interruption attempt in response to a start of the second detected audio being received during a presentation time of the first detected audio, render an interruption notification to the second user device, and control a manner of rendering the second detected audio based on interruption control settings.

27 Claims, 13 Drawing Sheets

(56)     References Cited

U.S. PATENT DOCUMENTS

| | | | | |
|---|---|---|---|---|
| 2015/0189028 A1* | 7/2015 | Sayed | .................. | H04W 4/021 |
| | | | | 709/204 |
| 2016/0337743 A1* | 11/2016 | Neeley | ................ | H04R 1/1041 |
| 2016/0379636 A1* | 12/2016 | Panin | ...................... | G10L 15/32 |
| | | | | 704/235 |
| 2022/0239848 A1* | 7/2022 | Swierk | .................. | H04N 7/152 |
| 2022/0345988 A1* | 10/2022 | Ong | ................. | H04W 72/1215 |
| 2022/0385491 A1* | 12/2022 | Morris | ............... | H04L 12/1822 |
| 2023/0133750 A1* | 5/2023 | Shayne | ................. | H04N 7/147 |
| | | | | 348/14.09 |
| 2024/0386892 A1* | 11/2024 | Varshney | ............. | G06F 16/634 |
| 2024/0428195 A1* | 12/2024 | Hood | .................... | G10L 15/26 |
| 2025/0069761 A1* | 2/2025 | Suzuki | .................. | G16H 80/00 |

OTHER PUBLICATIONS

Stivers et al, "Universals and Cultural Variation In Turn-Taking In Conversation," International Computer Science Institute, Berkley, CA, Retrieved from [https://www.pnas.org/doi/10.1073/pnas. 0903616106] on Jun. 21, 2022, vol. 106, No. 26, Jun. 30, 2009, 14 pages.
International Telecommunication Union, "Transmission Systems and Media, Digital Systems and Networks," Retrieved from [https://www.itu.int/rec/T-REC-g] on Jun. 21, 2022, 2003, 28 pages.

* cited by examiner

METHODS, SYSTEMS, ARTICLES OF MANUFACTURE, AND APPARATUS TO FACILITATE MULTI-PARTICIPANT CONVERSATION

FIELD OF THE DISCLOSURE

This disclosure relates generally to remote conversations and, more particularly, to methods, systems, articles of manufacture, and apparatus to facilitate multi-participant conversation.

BACKGROUND

In recent years, virtual meetings (e.g., remote conversations, classes, presentations, discussions, etc.) have become more prevalent, especially among younger users for educational purposes. Virtual conversations can be beneficial as they enable conversations to occur with less burden on the participants. For example, the participants do not need to travel or come within a close physical proximity of one another to participate in the virtual conversation.

BRIEF DESCRIPTION OF THE DRAWINGS

In general, the same reference numbers will be used throughout the drawing(s) and accompanying written description to refer to the same or like parts.

Figure 1:
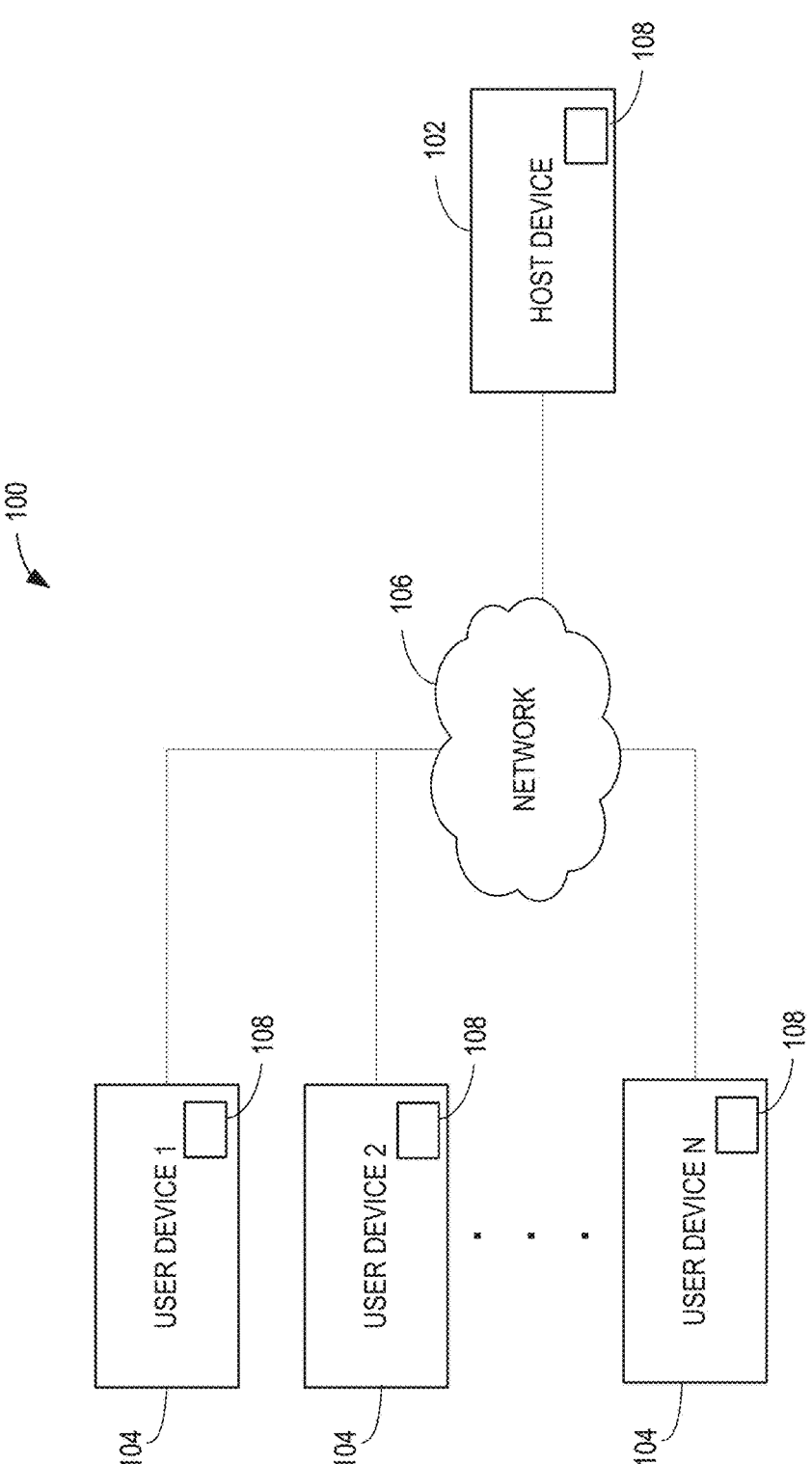
FIG. 1 is a block diagram of an example remote conversation platform.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Virtual meetings can be advantageous for participants who would otherwise be unable to, or face a significant burden in an attempt to, meet in person for a conversation with one or more other participants. For example, participants may face an illness, exposure to someone with an illness, a long trip, a substantial geographic distance, and/or inclement weather that increases a danger of traveling. Virtual meetings have become increasingly prevalent in educational settings, which allows, for example, teachers to educate students even when unable to meet in person.

However, in virtual meetings, participants often talk over each other as a result of impatient behavior and/or an unfamiliarity with how the virtual environment operates. For instance, the virtual environment can increase a difficulty of picking up social cues, especially when unable to see other participants. As such, interruptions may not occur based on malice or rudeness, but perhaps on a lack of understanding regarding how a virtual meeting system (e.g., a network-connected computing system to facilitate voice, video and/or instant messaging between nodes) operates. Such interruptions often reduce a productivity of the meeting as listeners may be unable to hear spoken words as a result of the interruption and/or speakers may be asked to repeat themselves. Accordingly, interruptions in virtual meetings can increase meeting durations and frustrate participants.

Such interruptions are especially common in virtual learning environments as a result of students' impatience and/or immaturity. The increased prevalence of virtual learning environments also presents a difficulty in teaching students not to interrupt the teacher or their peers. For example, muting students when it is not their turn to talk does not prevent the student from speaking at an inappropriate time and ignoring the teacher or their peers. Accordingly, students may be unable to, or take a longer time to, learn important social behaviors as a result of being taught in the virtual learning environment.

Examples disclosed herein provide methods, systems, articles of manufacture, and apparatus to facilitate multi participant conversation in a manner that controls interruptions in virtual meetings (e.g., remote meetings) and teaches participants appropriate instances to speak.

Examples disclosed herein provide interruption circuitry to detect audio from user devices participating in a virtual meeting. For example, the interruption circuitry can detect first audio from (e.g., sensed at) a first user device as well as second audio from (e.g., sensed at) a second user device. The example interruption circuitry can determine the second detected audio is an interruption attempt in response to an inception (e.g., a beginning, a start, an initiation, etc.) of the second detected audio being received (e.g., occurring) during a presentation time (e.g., playback) of the first detected audio. For example, when the audio from respective user devices is presented in the virtual meeting via separate respective audio streams, the interruption circuitry can identify an interruption attempt in response to detecting an inception of activity in a first audio stream during a presentation or playback of audio from a second audio stream. Further, when the audio from the respective user devices is presented in the virtual meeting via a single audio stream, the interruption circuitry can utilize voice recognition to detect the interruption. Specifically, the interruption circuitry can identify the interruption in response to detecting a first voice commencing speech (e.g., beginning, originating) while a second voice is being presented.

In some disclosed examples, the interruption circuitry detects an end of a speaking period (e.g., a presentation period) reserved for a user device in response to detecting no audio (e.g., an absence of audio input at a microphone, a detection of a duration of silence, etc.) from the user device for at least a threshold period. In turn, the interruption circuitry can allow audio from any other user device to be presented in response to detecting the end of the speaking period. On the other hand, the interruption circuitry can determine the speaking period is to continue, and, thus, interruption attempts are to be addressed, when the audio from the user device is not silent (e.g., does not pause) for a duration longer than the threshold period. As such, the interruption circuitry allows the speaker to take natural pauses while still detecting interruption attempts and adjusting the audio associated therewith. In some disclosed examples, the interruption circuitry sets a duration of the threshold period based on a localization of a particular language being presented by the user devices in the virtual meeting to account for cultural differences in speech. Stated differently, some observed cultural differences exhibit particular speech patterns that include pauses between sentences that are relatively longer when compared to other observed cultural speech tendencies. As used herein "threshold" is expressed as data such as a numerical value represented in any form, that may be used by processor circuitry as a reference for a comparison operation.

In some disclosed examples, in response to determining incoming audio from a user device is an interruption attempt (e.g., either an intentional interruption or an innocent or benign interruption), the interruption circuitry renders an interruption notification to the user device (e.g., the interrupter). For example, the interruption notification can notify the interrupter that speaking is not allowed at the given moment. Additionally, the example interruption circuitry can render another interruption notification to other user devices (e.g., the speaker and/or listeners) and/or a host device (e.g., another listener or the speaker). In some disclosed examples, an interruption notification presented at the host device prompts the host to indicate how to adjust the audio associated with the interruption attempt.

The example interruption circuitry disclosed herein controls the audio from the device associated with the interruption attempt. For example, the interruption circuitry can cause audio from a device associated with the interruption attempt to be muted. Alternatively, the interruption circuitry can cause the interrupting audio to be delayed and/or spatialized to enable the interrupting audio to be presented while still ensuring listeners are able to understand the non-interrupting audio (e.g., the originally presented audio). In some disclosed examples, in response to muting the device associated with the interruption attempt, the interruption circuitry can record the audio captured by the interrupting device for a subsequent presentation of that audio at a different (e.g., later) time. For example, the subsequent presentation can be an audible presentation when the original audio being presented ends (e.g., when the non-interrupting speaker is finished speaking) or during a period of the virtual meeting reserved for questions and/or comments (e.g., a Q&A period). Alternatively, the subsequent presentation of the interrupting audio can be in a text format presented via a chat window in the virtual meeting, for example.

In some disclosed examples, the interruption circuitry determines how to adjust the audio corresponding to the interruption attempt based on interruption control settings. For example, the interruption control settings can indicate whether the interruption circuitry is to mute the interruption audio, spatialize the interruption audio, or delay the interruption audio during the presentation time of the non-interruption audio. In some disclosed examples, the interruption circuitry enables the host device to configure the interruption control settings.

As such, the interruption circuitry can handle the interruption attempt in accordance with expectations for particular virtual meetings. For example, when the virtual meeting is intended to be a discussion with back-and-forth interactions, the host device can configure the interruption control settings to cause audio that is interrupting another speaker to be spatialized or delayed such that listeners are able understand the interrupting audio as well as audio from the initial speaker.

As used herein, audio "spatialization" and causing audio to be "spatialized" refers to an adjustment in the presentation of audio that causes first audio from a first audio source (e.g., a first participant) to be audibly presented from a first location (e.g., a first channel, a right speaker, etc.), or to sound as if the first audio originates from the first location, and causes second audio from a second audio source (e.g., a second participant) to be presented from a second location (e.g., a second channel, a left speaker, etc.), or to sound as if the second audio originates from the second location, to help a listener to distinguish between the first audio and the second audio. For example, when audio is "spatialized," the first audio can be presented through the first channel and/or the right speaker while the second audio is presented through the second channel and/or the left speaker to cause the listener to hear the first audio in one ear and hear the second audio in another ear. In some examples, when audio is "spatialized," different audio sources sound like they are coming from different points in space relative to the listener (e.g., in front of the listener, behind the listener, from one side of the listener, etc.). Accordingly, causing the audio to be "spatialized" helps the listener understand audio from more than one participant being presented at a given instance.

Alternatively, in examples where the virtual meeting is intended to be a presentation with one or more main speakers (e.g., a presenter(s)), the host device can configure the interruption control settings to cause the interruption audio to be muted. Furthermore, the interruption control settings can enable the host device to configure a priority of devices or users associated with the virtual meeting to spatialize interruption audio from certain users (e.g., members of a group providing a presentation) while muting interruption audio from other users. In some disclosed examples, the interruption circuitry includes predetermined interruption control settings for particular meeting types (e.g., a discussion, a presentation with one presenter, a presentation with multiple presenters, etc.) to enable the host device to quickly adjust the interruption control settings as desired.

Advantageously, the interruption detection and control as disclosed herein enables a productivity and efficiency of virtual meetings to be optimized or otherwise increased by controlling audio of interruption attempts. In some examples, the interruption circuitry prevents the interruption audio corresponding to the interrupting device from being presented to all participant devices associated with the virtual call. Furthermore, the interruption notifications as disclosed herein enable users to learn important social behaviors, such as when it is an appropriate time to speak. Thus, the interruption circuitry can help educate younger users in a virtual classroom.

On the other hand, in some examples, the interruption circuitry delays, spatializes, or records the interruption audio such that the interrupter is still able to share their thoughts with members of the virtual meeting in a manner that enables the virtual meeting to remain productive, which can be useful in virtual meetings where users are more mature. For example, a user may be aware that their speaking would be an interruption but are also aware that the interruption circuitry can the control the interruption audio to prevent their words from being presented in a manner that interrupts the current speaker. As such, interruption circuitry can even increase contributions from members in the virtual meeting as the members can share any thoughts that come to mind while a speaker is talking without worrying about interrupting the speaker. As a result, the interruption circuitry can help prevent such thoughts from otherwise being forgotten (e.g., had the user waited until the speaker was finished).

FIG. 1 is a block diagram of an example virtual meeting platform 100 to facilitate communications between participants in a virtual meeting (e.g., a remote meeting). For example, the virtual meeting platform 100 can host a remote class, a remote meeting, a remote presentation, or any other conversation with multiple participants. In the illustrated example of FIG. 1, the virtual meeting platform includes a host device 102 (e.g., a superuser), user devices 104 (e.g., USER DEVICE 1, USER DEVICE 2, USER DEVICE N, etc.), and a network 106. In the illustrated example of FIG. 1, the host device 102 and the user devices 104 include interruption circuitry 108.

In the illustrated example of FIG. 1, the network 106 provides communication between the host device 102 and the user devices 104. In FIG. 1, the network 106 is implemented as a public network, such as the Internet. However, any other type of networks (e.g., wired/cabled, wireless, mobile cellular, etc.), which may be public or private, and any combination thereof may additionally and/or alternatively be used. Additionally, although the example virtual meeting platform 100 utilizes the network 106 for communications between the host device 102 and the user devices 104, it should be understood that the host device 102 and the user devices 104 can communicate using any alternative forms of communication to implement the examples disclosed herein.

In the illustrated example of FIG. 1, the example host device 102 and the example user devices 104 include accessories that facilitate communications between participants in the virtual meeting platform 100 (e.g., between the host device 102 and the user devices 104). For example, the host device 102 and the user devices 104 can include at least one speaker, a microphone, and/or a display screen. The example host device 102 and the example user devices 104 can be implemented by any personal electronic system, such as a desktop computer, a laptop computer, a tablet, a phone, etc., that can be utilized to communicate with users of other devices.

In the illustrated example of FIG. 1, the host device 102 and the user devices 104 include interruption circuitry 108. The example interruption circuitry 108 monitors audio of the host device 102 and the user devices 104. Further, the example interruption circuitry 108 detects interruption attempts in the virtual meeting platform 100 based on the audio of the host device 102 and the user devices 104. For example, the interruption circuitry 108 can detect first audio from a first one of the user devices 104 (e.g., USER DEVICE 1) and detect second audio from a second one of the user devices 104 (e.g., USER DEVICE 2).

As used herein, "first audio" is audio sensed by the first one of the user devices 104 at a first time, and "second audio" is audio sensed by the second one of the user devices 104 at a second time after the first time. Additionally, as used herein, "first detected audio" is audio detected (e.g., received) by one or more of the user devices 104 at a first time, and "second detected audio" is audio detected (e.g., received) by one or more of the user devices 104 at a second time after the first time. Accordingly, while the "first audio" is temporally occurring prior to the "second audio," the "second audio" may be the "first detected audio" by one or more of the user devices 104 due to latency differences between the respective user devices 104.

Further, the example interruption circuitry 108 can determine the second detected audio is an interruption attempt in response to a start of the second detected audio being received during a presentation time of the first detected audio. In other words, the example interruption circuitry 108 can determine the second detected audio is an interruption attempt in response to detecting that a microphone associated with the second one of the user devices 104 is sensing the start of the second audio while speakers are presenting the first audio to one or more of the user devices 104 and/or the host device 102. In response to detecting the interruption attempt, the example interruption circuitry 108 renders an interruption notification to the second one of the user devices 104 (e.g., USER DEVICE 2). In some examples, the interruption circuitry 108 renders notifications to the host device 102 and/or the other user devices 104 (e.g., USER DEVICE 1, USER DEVICE N, etc.) in response to detecting the interruption attempt. Further, the example interruption circuitry 108 controls the second detected audio based on interruption control settings, as discussed in further detail below.

Figure 2:
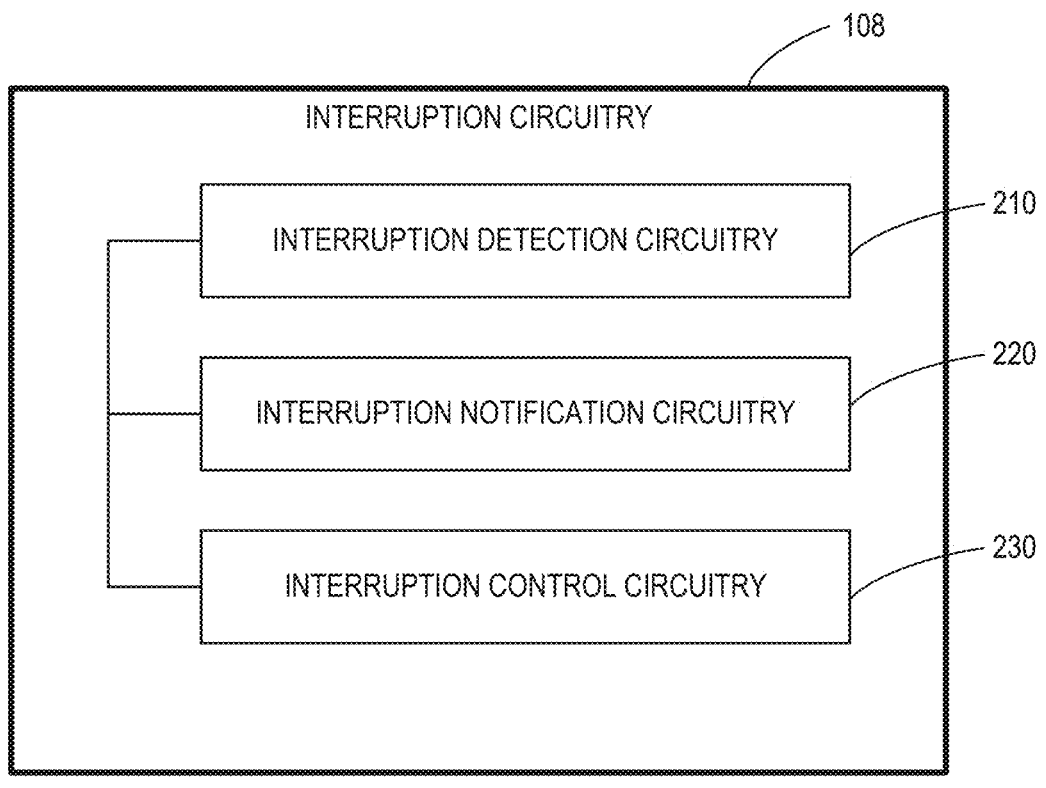
FIG. 2 is a block diagram of example interruption circuitry of the example remote discussion platform of FIG. 1.

FIG. 2 is a block diagram of the example interruption circuitry 108 of FIG. 1 to facilitate conversations and/or other interactions between users (e.g., meeting participants) associated with the example host device 102 and the example user devices 104 in the example virtual meeting platform 100 of FIG. 1. The example interruption circuitry 108 of FIG. 2 may be instantiated (e.g., creating an instance of, bring into being for any length of time, materialize, implement, etc.) by processor circuitry such as a central processing unit executing instructions. Additionally or alternatively, the example interruption circuitry 108 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by microprocessor circuitry executing instructions to implement one or more virtual machines and/or containers. In the illustrated example of FIG. 2, the interruption circuitry 108 includes example interruption detection circuitry 210, example interruption notification circuitry 220, and example interruption control circuitry 230.

In the illustrated example of FIG. 2, the interruption detection circuitry 210 monitors audio streams of devices in the virtual meeting platform 100 (e.g., the host device 102 and the user devices 104). As such, the interruption detection circuitry 210 can detect speech of a user being presented at the host device 102 and/or the user devices 104 based on the audio streams. In some examples, the interruption detection circuitry 210 renders visual indications for respective users of the host device 102 and/or the user devices 104 indicative of whether the respective users are permitted to speak in the virtual meeting at a given moment. In some examples, the interruption detection circuitry 210 causes a first visual indication representative of permission to speak to be presented in a first area of a display associated with the speaker.

Similarly, in some examples, the interruption detection circuitry 210 causes a second visual indication representative of not having permission to speak to be presented in a second area of the display associated with another user who is being asked to listen to the speaker without speaking (i.e., interrupting).

In the illustrated example of FIG. 2, the interruption detection circuitry 210 determines the user is finished speaking in response to the audio from the respective user device 104 associated with the user being silent (e.g., in response to no activity in an audio stream from the user device 104, in response to not detecting the voice of the user) for at least a threshold period. The example interruption detection circuitry 210 can set the threshold period to account for normal pauses in speech. For example, the interruption detection circuitry 210 can set the threshold period to be greater than pauses typically encountered between sentences during speech. In some examples, the interruption detection circuitry 210 sets the threshold period based on a localization or geographical location of the user devices 104 and/or the host devices 102 to account for typical pauses encountered during speech for various languages. In some examples, the interruption detection circuitry 210 can learn a duration to be utilized for the threshold period based on pauses in speech encountered during an initial portion of the virtual meeting or during previous virtual meetings with one or more common participants. In response to determining a participant in the virtual meeting is finished speaking, the interruption detection circuitry 210 can update the visual indications for the respective user devices 104 to indicate that the users have permission to speak at the given moment.

In the illustrated example of FIG. 2, the interruption detection circuitry 210 detects an interruption attempt in response to a start of first detected audio from a first one of the user devices 104 (e.g., USER DEVICE 1) being detected when second detected audio from a second one of the user devices 104 (e.g., USER DEVICE 2) is being presented in the virtual meeting. For example, the interruption detection circuitry 210 can generate a timestamp in response to receiving a start of audio from one of the user devices 104. Thus, the interruption detection circuitry 210 can generate a first timestamp corresponding to a first time in response to receiving the first detected audio and generate a second timestamp corresponding to a second time later than the first time in response to receiving the second detected audio. In turn, the interruption detection circuitry 210 can compare the first timestamp to the second timestamp to determine whether the first detected audio or the second detected audio is the interruption attempt.

In some examples, the interruption detection circuitry 210 operates at a central server communicatively coupled to the network 106. In such examples, the interruption detection circuitry 210 generates the timestamps for audio associated with each of the user devices 104 and the host device 102 such that the timestamps are synchronized for all participants. Thus, the interruption detection circuitry 210 can account for a time drift or a time stamp disparity between the host device 102 and/or the respective user devices 104.

In some examples, the interruption detection circuitry 210 determines whether an interrupter is prioritized over an initial speaker. For example, the interruption detection circuitry 210 may allow the host device 102 to interrupt one or more of the user devices 104. In some examples, the interruption detection circuitry 210 is instantiated by processor circuitry executing interruption detection instructions and/or configured to perform operations such as those represented by the flowchart of FIG. 7.

In the illustrated example of FIG. 2, in response to the interruption detection circuitry 210 detecting an interruption, the interruption notification circuitry 220 renders an interruption notification to the respective user device 104 that caused the interruption. For example, interruption notification circuitry 220 can present a visual indication via a display of the respective user device 104 that caused the interruption to notify the respective user that speaking at this moment is an interruption over the speech of another user. In some examples, the interruption notification circuitry 220 tracks interruptions caused by the respective users in the virtual meeting to help monitor the behavior of the users. Additionally, the example interruption notification circuitry 220 can render another interruption notification to the host device 102 to alert a user associated with the host device 102 (e.g., a host, a presenter, a teacher, etc.) of a particular user in the virtual meeting that is attempting to interrupt the speaker. Further, the example interruption notification circuitry 220 may enable the user associated with the host device 102 to indicate how the interruption is to be handled. In some examples, the example interruption notification circuitry 220 renders another interruption notification to the speaker and/or listeners. In some examples, the interruption notification circuitry 220 is instantiated by processor circuitry executing interruption notification instructions and/or configured to perform operations such as those represented by the flowchart of FIG. 8.

In the illustrated example of FIG. 2, the interruption control circuitry 230 controls interrupting audio based on interruption control settings. For example, the interruption control circuitry 230 can invite the host device 102 to indicate whether the audio of the interruption attempt is to be muted, delayed, or spatialized during the virtual meeting via the interruption control settings. Accordingly, the interruption control circuitry 230 can mute, delay, or spatialize the audio of the interruption attempt during the virtual meeting to accommodate preferences indicated by the host of the virtual meeting. In response to the audio of the interruption attempt being muted, the interruption control circuitry 230 can determine whether the interruption is to be presented at a later instance. For example, the interruption control circuitry 230 can generate a recording of the audio defining the interruption attempt and present the recording in response to the current speaker being finished speaking or during a reserved period of the virtual meeting (e.g., a Q&A period). In some examples, the interruption control circuitry 230 transcribes the audio defining the interruption attempt or the recording of the audio defining the interruption attempt and renders text corresponding to what was said in the interruption attempt to one or more of the user devices 104 and/or the host device 102 in the virtual meeting. In some examples, interruption control circuitry 230 prompts the host device 102 and/or the interrupter (e.g., the respective user device 104 associated with the interruption attempt) to indicate whether the audio of the interruption attempt or text corresponding thereto is to be presented in the virtual meeting.

In some examples, the interruption circuitry 108 of the user devices 104 hides or disables the interruption control circuitry 230 to enable the host device 102 to have unchallenged control over how interruption attempts are handled in the virtual meeting. For example, when a computing device (e.g., one of the user devices 104) joins a virtual meeting and is not a host of, or a privileged user in, the virtual meeting, the interruption circuitry 108 can lock the interruption control circuitry 230 such that a user of the computing device is unable to make modifications to the interruption control settings. In some examples, the interruption control circuitry 230 is instantiated by processor circuitry executing interruption notification instructions and/or configured to perform operations such as those represented by the flowchart of FIG. 9.

Figure 3:
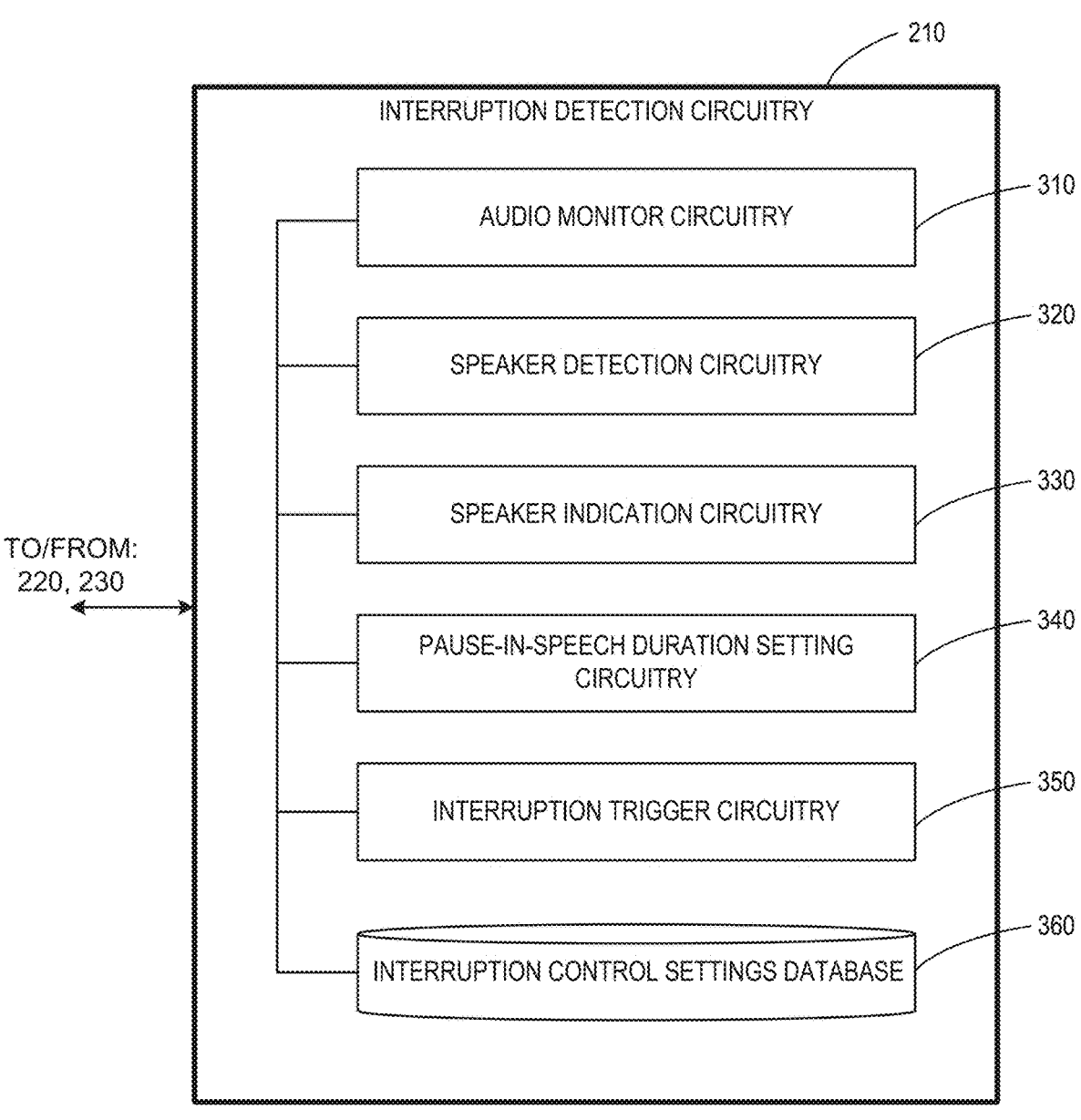
FIG. 3 is a block diagram of example interruption detection circuitry of the example interruption circuitry of FIG. 2.

FIG. 3 is a block diagram of the example interruption detection circuitry 210 of FIG. 2. The example interruption detection circuitry 210 of FIG. 3 may be instantiated (e.g., creating an instance of, bring into being for any length of time, materialize, implement, etc.) by processor circuitry such as a central processing unit executing instructions. Additionally or alternatively, the example interruption detection circuitry 210 of FIG. 3 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 3 may, thus, be instantiated at the same or different times. Some or all of the circuitry may be instantiated, for example, in one or more threads executing concurrently on hardware and/or in series on hardware. Moreover, in some examples, some or all of the circuitry of FIG. 3 may be implemented by microprocessor circuitry executing instructions to implement one or more virtual machines and/or containers. In the illustrated example of FIG. 3, the interruption detection circuitry 210 includes example audio monitor circuitry 310, example speaker detection circuitry 320, example speaker indication circuitry 330, example pause-in-speech duration setting circuitry 340, example interruption trigger circuitry 350, and an example interruption control settings database 360.

The interruption detection circuitry 210 of FIG. 3 includes the example audio monitor circuitry 310 to monitor audio streams to be presented in the virtual meeting. In some examples, the audio monitor circuitry 310 identifies first detected audio at a first time from a first one of the user devices 104 of FIG. 1 (e.g., USER DEVICE 1) in a first audio stream and identifies second detected audio at a second time after the first time from a second one of the user devices 104 (e.g., USER DEVICE 2) in a second audio stream. That is, in some examples, the audio monitor circuitry 310 monitors respective audio streams for the respective user devices 104 and the host device 102 in the virtual meeting. In some examples, the audio monitor circuitry 310 monitors a single audio stream for all, or more than one, of the participants in the virtual meeting (e.g., the host device 102 and/or the user devices 104). The example audio monitor circuitry 310 generates a timestamp in response to detecting or receiving a start of audio from one of the user devices 104. In some examples, the audio monitor circuitry 310 can associate the generated timestamp with the respective one of the user devices 104 from which the audio is being received. In some examples, in response to receiving a signal indicative of the respective user device 104 being the speaker in the virtual meeting, the audio monitor circuitry 310 determines that no further timestamp is to be generated for the respective user device 104 until a signal indicative of the speaker being finished is received.

In some examples, when the respective user devices 104 and the host device 102 provide audio through respective audio streams, the audio monitor circuitry 310 determines the respective one of the user devices 104 to which the timestamp is to be assigned based on the respective audio stream in which activity is occurring and the respective user device 104 associated with the audio stream. In some examples, when the respective user devices 104 and the host device 102 provide audio through a single, combined audio stream, the audio monitor circuitry 310 assigns the timestamp to the respective one of the user devices 104 associated with a voice presenting the audio. For example, when audio from more than one of the participants is to be merged into a single audio stream in a virtual meeting, the audio monitor circuitry 310 can cause participants to be prompted to speak in advance of joining the virtual meeting. In turn, the audio monitor circuitry 310 can analyze voices associated with the respective participants and identify the respective user device 104 (i.e., the participant) from which the audio is originating in the virtual meeting based on the voice in the audio. In some examples, the audio monitor circuitry 310 is instantiated by processor circuitry executing audio monitor instructions and/or configured to perform operations such as those represented by the flowchart of FIG. 7.

The interruption detection circuitry 210 of FIG. 3 includes the example speaker detection circuitry 320 to determine a participant (e.g., a respective one of the user devices 104 of FIG. 1) from which audio is being presented in the virtual meeting. In some examples, the speaker detection circuitry 320 determines the participant that is speaking at a given moment based on activity in the respective audio streams associated with the respective user devices 104 and/or the host device 102. In some examples, the speaker detection circuitry 320 determines the participant associated with the audio being presented based on a voice in the audio. In some examples, the speaker detection circuitry 320 transmits a signal indicative of the respective user device 104 or the host device 102 associated with the participant that is speaking to the audio monitor circuitry 310, the speaker indication circuitry 330, the pause-in-speech duration setting circuitry 340, and/or the interruption trigger circuitry 350. In some examples, the speaker detection circuitry 320 is instantiated by processor circuitry executing speaker detection instructions and/or configured to perform operations such as those represented by the flowchart of FIG. 7.

The interruption detection circuitry 210 of FIG. 3 includes the example speaker indication circuitry 330 to render visual indications to one or more displays of the host device 102 and/or the user devices 104 indicative of who is permitted to be a speaker in the virtual meeting at a given moment and/or who is restricted to being a listener in the virtual meeting at the given moment. For example, the speaker indication circuitry 330 can render a stoplight icon with emblems associated with the respective participants in the virtual meeting. Further, the speaker indication circuitry 330 can cause the stoplight icon to display an illuminated green light when the participant has permission to speak or cause the stoplight to display an illuminated red light when the participant would be interrupting someone by speaking at the given moment. As such, the speaker indication circuitry 330 can help participants learn appropriate moments to speak while avoiding trial and error. In some examples, the speaker indication circuitry 330 is instantiated by processor circuitry executing speaker indication instructions and/or configured to perform operations such as those represented by the flowchart of FIG. 7.

The interruption detection circuitry 210 of FIG. 3 includes the example pause-in-speech duration setting circuitry 340 to determine a threshold period corresponding to a length of time where a participant is able to pause (e.g., be silent in a gap between words) while remaining the identified speaker at the given moment. For example, the pause-in-speech duration setting circuitry 340 can determine the threshold period based on a localization, a geographic location, and/or a spoken language of the participants in the virtual meeting. In some examples, the pause-in-speech duration setting circuitry 340 determines the threshold period based on a program, a company, and/or organization associated with the participants in the virtual meeting. In some examples, the pause-in-speech duration setting circuitry 340 learns and/or updates the threshold period based on pauses (e.g., gaps) encountered while the participants speak during an initial period of the virtual meeting (e.g., an initial 30 seconds, an initial 2 minutes, an initial 5 minutes, etc.).

In some examples, the pause-in-speech duration setting circuitry 340 sets the threshold period for respective participants. In some examples, the pause-in-speech duration setting circuitry 340 can set the threshold period of a respective one of the user devices 104 and/or the host devices 102 based on a priority of the respective participant. For example, when a participant is giving a presentation, the pause-in-speech duration setting circuitry 340 can assign a relatively longer threshold period to the respective user device 104 or the host device 102 associated with the participant to enable the participant to pause during transitions in the presentation without losing the speaker identification. In some examples, the pause-in-speech duration setting circuitry 340 learns the respective threshold periods to assign to the respective user devices 104 and/or the host device 102 based on one or more speaking patterns (e.g., timing patterns between active and inactive audio) that the participants presented in the past. For example, when audio from a first one of the user devices 104 often includes longer pauses than audio from a second one of the user devices 104, the pause-in-speech duration setting circuitry 340 can assign a longer threshold period to the first one of the user devices 104 compared to the second one of the user devices 104. Accordingly, in response to the speaker detection circuitry 320 identifying the respective user device 104 or the host device 102 associated with the speaker being presented in the virtual meeting, the pause-in-speech duration setting circuitry 340 can implement the threshold period associated with the respective user device 104 or the host device 102. In some examples, the pause-in-speech duration setting circuitry 340 triggers activation of a timer corresponding the threshold period in response to the audio monitor circuitry 310 ceasing to detect audio from the respective user device 104 or the host device 102. Further, the pause-in-speech duration setting circuitry 340 resets the timer in response to the audio monitor circuitry 310 detecting audio from the respective user device 104 or the host device 102 in advance of the timer expiring. Conversely, in response to the timer expiring, the pause-in-speech duration setting circuitry 340 can transmit a signal indicative of the speaker being finished to the audio monitor circuitry 310, the speaker detection circuitry 320, the speaker indication circuitry 330, and/or the interruption trigger circuitry 350.

In some examples, the pause-in-speech duration setting circuitry 340 sets the threshold period for respective participants in the virtual meeting based on a latency associated with the respective user devices 104. For example, when a first one of the user devices 104 (e.g., USER DEVICE 1) is encountering an increased network latency compared to the other ones of the user devices 104 (e.g., USER DEVICE 2, USER DEVICE N, etc.), the pause-in-speech duration setting circuitry 340 can assign a longer threshold period to the first one of the user devices 104 compared to the other ones of the user devices 104. As a result, the example pause-in-speech duration setting circuitry 340 can enable interruptions to be detected when, although the user of the first one of the user devices 104 may not recognize the speech as an interruption because of the delay caused by the network latency, the audio from the first one of the user devices 104 would in fact be an interruption at the other ones of the user devices 104 and/or the host device 102. As such, the example pause-in-speech duration setting circuitry 340 can help prevent interruptions from going undetected. In some examples, the pause-in-speech duration setting circuitry 340 is instantiated by processor circuitry executing pause-in-speech duration setting instructions and/or configured to perform operations such as those represented by the flowchart of FIG. 7.

The interruption detection circuitry 210 of FIG. 3 includes the example interruption trigger circuitry 350 to detect interruption attempts during the virtual meeting. The example interruption trigger circuitry 350 can determine incoming audio is an interruption attempt in response to the audio monitor circuitry 310 detecting a start of the incoming audio during an audible presentation of other audio in the virtual meeting. For example, when the audio monitor circuitry 310 detects first audio incoming from a first one of the user devices 104 (e.g., USER DEVICE 1) or the host device 102 and subsequently detects second audio incoming from a second one of the user devices 104 (e.g., USER DEVICE 2) without detecting that the first audio has stopped for at least the threshold period defined by the pause-in-speech duration setting circuitry 340, the interruption trigger circuitry 350 can determine the second audio is an interruption attempt. In turn, the example interruption trigger circuitry 350 can determine the participant associated with the second one of the user devices 104 attempted to interrupt and flag the participant as an interrupter. In some examples, the interruption trigger circuitry 350 determines which of the user devices 104 is associated with the interruption attempt based on the timestamps generated by the audio monitor circuitry 310.

In some examples, in response to detecting the interrupter, the interruption trigger circuitry 350 performs a look-up of the interrupter (e.g., the respective one of the user devices 104 associated with the interrupter) in the interruption control settings database 360 to determine whether the interrupter is allowed to interrupt certain participants in the virtual meeting. Further, in response to determining that the interrupter is prioritized over certain other participants in the virtual meeting via the interruption control settings database 360, the interruption trigger circuitry 350 performs a second look-up of the participant being interrupted (e.g., the host device 102 or the respective one of the user devices 104 associated with the interrupted participant). Accordingly, the example interruption trigger circuitry 350 can determine the interruption was allowed and, thus, no action is to be taken to address the interruption in response to determining the priority associated with the interrupter indicates that the interrupter is allowed to interrupt the earlier speaker. In some examples, the interruption trigger circuitry 350 transmits a signal indicative of an allowed interruption occurring to the interruption control circuitry 230 of FIG. 2, which can spatialize the audio being presented to enable the audio to be more easily understood during the interruption, as discussed further in association with FIG. 5.

In some examples, in response to detecting the interruption attempt, the interruption trigger circuitry 350 can determine a quantity of devices (e.g., a quantity of the user devices 104 and/or the host device 102) that also detected the interruption attempt. For example, in response to detecting the interruption attempt at the user devices 104, the interruption trigger circuitry 350 of the respective user devices 104 can transmit a signal indicative of the interruption attempt being detected to the host device 102. In turn, the example interruption trigger circuitry 350 of the host device 102 can compare the quantity of devices that detected the interruption attempt to a device threshold (e.g., more than one device, half the devices in the virtual meeting, etc.). In some examples, in response to the quantity of the devices that detected the interruption attempt satisfying (e.g., being greater than) the device threshold, interruption trigger circuitry 350 verifies the detected interruption attempt is valid.

Figure 4:
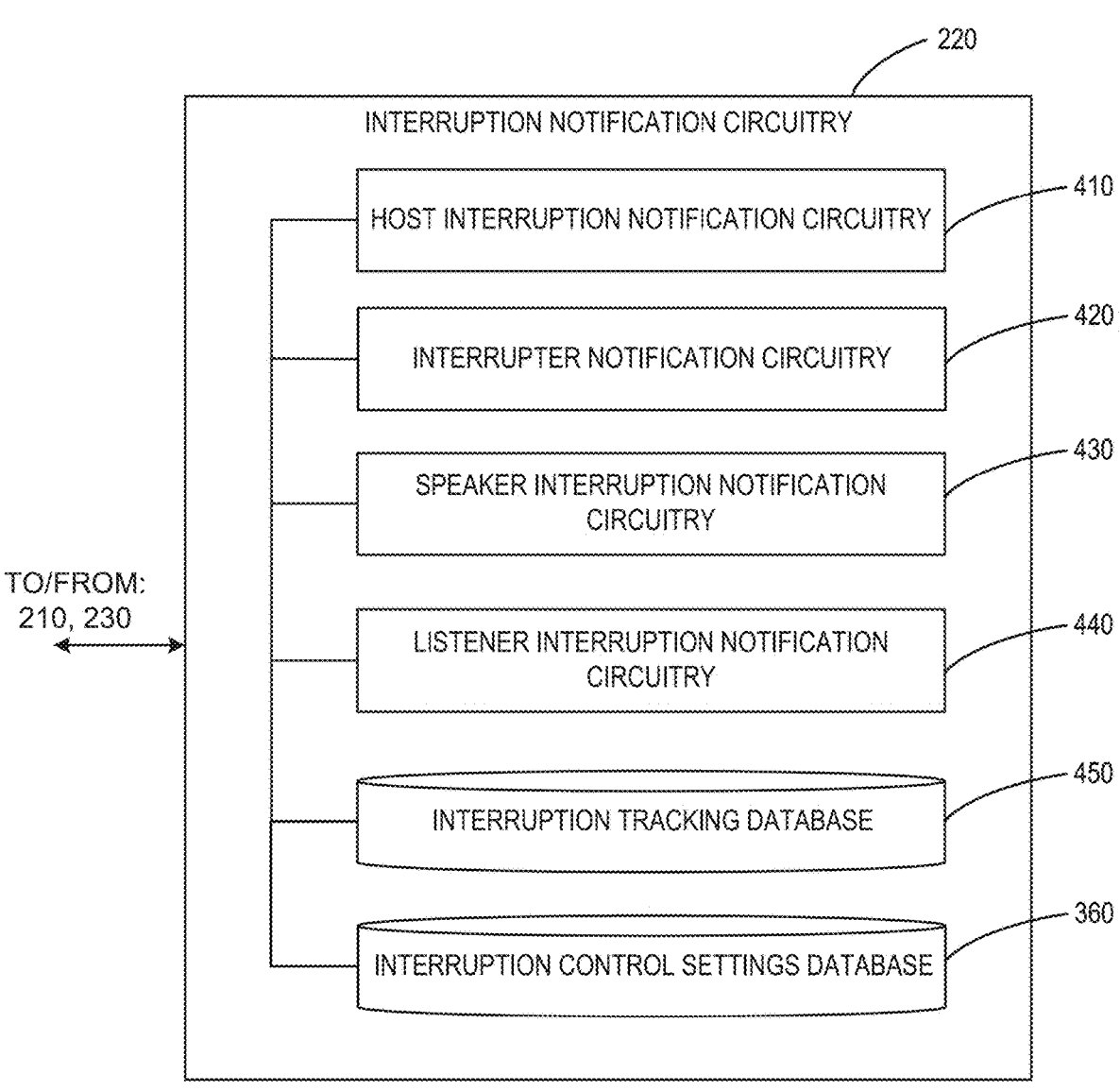
FIG. 4 is a block diagram of example interruption notification circuitry of the example interruption circuitry of FIG. 2.
Figure 5:
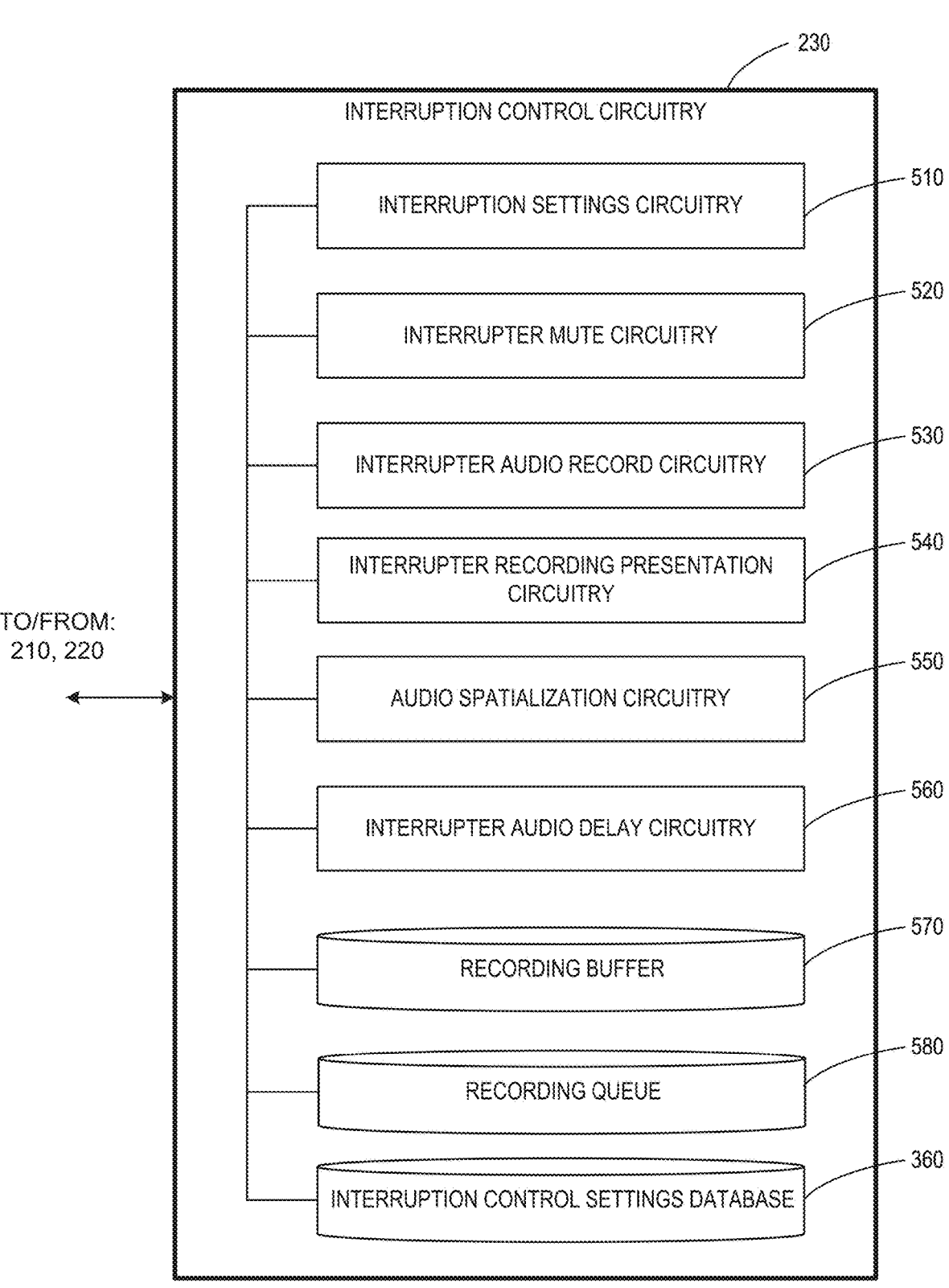
FIG. 5 is a block diagram of example interruption control circuitry of the example interruption circuitry of FIG. 2.

In response to detecting the interruption, and, in some examples, validating the interruption attempt and determining the interrupter is not allowed to interrupt the earlier speaker, the interruption trigger circuitry 350 can transmit a signal indicative of the respective one of the user devices 104 attempting to interrupt to the interruption notification circuitry 220 of FIG. 2, as discussed further in association with FIG. 4, and the interruption control circuitry 230 of FIG. 2, as discussed further in association with FIG. 5. In some examples, the interruption trigger circuitry 350 is instantiated by processor circuitry executing interruption trigger instructions and/or configured to perform operations such as those represented by the flowchart of FIG. 7.

The interruption detection circuitry 210 of FIG. 3 includes the example interruption control settings database 360 to store settings associated with the virtual meeting. For example, the interruption control settings database 360 can store speaking privileges associated with respective participants in the virtual meeting (e.g., respective participants associated with the host device 102 and the user devices 104). In some examples, the interruption control settings database 360 stores the threshold period utilized by the pause-in-speech duration setting circuitry 340 to determine when a presentation time for audio of a participant is to be terminated. In some examples, the interruption control settings database 360 stores user information associated with the respective users of the user devices 104 and/or the host device 102. For example, the user information can include a name, an organization, location information, primary language information, and/or any other information associated with the user. In some examples, the interruption control settings database 360 stores a voice classification for the respective users. Further, the example interruption control settings database 360 can store notification settings and/or predetermined notifications for the virtual meeting, as discussed in further detail in association with FIG. 4. Additionally, the example interruption control settings database 360 stores audio adjustment settings to be utilized for the respective user devices 104 and/or the host device 102 in response to an interruption attempt, as discussed further in association with FIG. 5. The example interruption control circuitry 230 of FIG. 2 can configure the settings stored in the example interruption control settings database 360, as discussed further in association with FIG. 5. Accordingly, the example interruption control circuitry 230 of FIG. 2 can transmit the example interruption control settings database 360 to the example interruption detection circuitry 210 and/or the interruption notification circuitry 220.

FIG. 4 is a block diagram of example interruption notification circuitry 220 of FIG. 2. The example interruption notification circuitry 220 of FIG. 4 may be instantiated (e.g., creating an instance of, bring into being for any length of time, materialize, implement, etc.) by processor circuitry such as a central processing unit executing instructions. Additionally or alternatively, the example interruption notification circuitry 220 of FIG. 4 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 4 may, thus, be instantiated at the same or different times. Some or all of the circuitry may be instantiated, for example, in one or more threads executing concurrently on hardware and/or in series on hardware. Moreover, in some examples, some or all of the circuitry of FIG. 4 may be implemented by microprocessor circuitry executing instructions to implement one or more virtual machines and/or containers. In the illustrated example of FIG. 4, the interruption notification circuitry 220 includes example host interruption notification circuitry 410, example interrupter notification circuitry 420 example speaker interruption notification circuitry 430, example listener interruption notification circuitry 440, an example interruption tracking database 450, and/or the example interruption control settings database 360.

The interruption notification circuitry 220 of FIG. 4 includes the host interruption notification circuitry 410 to render interruption notifications to the host device 102. For example, in response to the interruption detection circuitry 210 detecting an interruption, the host interruption notification circuitry 410 can render a notification (e.g., a message, an alert, a banner, etc.) to a display of the host device 102 indicating user information associated with the respective user device 104 from which the interruption attempt was detected.

In some examples, the host interruption notification circuitry 410 renders interruption control options to the host device 102 to enable the user of the host device 102 (e.g., the host of the virtual meeting) to indicate a manner according to which the interruption circuitry 108 is to respond to the interruption attempt. For example, the host interruption notification circuitry 410 can render the interruption control options stored in the interruption control settings database 360. The interruption control options can include audio adjustment options for audio of the interruption attempt. In some examples, the interruption control options include predetermined message options for the respective user devices 104 associated with the interrupter, the speaker, and/or the listeners. In some examples, the interruption control options enable the host to provide a custom message to the respective user devices 104 associated with the interrupter, the speaker, and/or the listener(s) in the virtual meeting.

In some examples, the host interruption notification circuitry 410 can cause the interrupter notification circuitry 420, the speaker interruption notification circuitry 430, and/or the listener interruption notification circuitry 440 to render certain notifications to the respective user devices 104 associated with the interrupter, the speaker, and/or the listeners. Furthermore, the example host interruption notification circuitry 410 can transmit a signal indicative of an audio adjustment option selected by the user of the host device 102 to the example interruption control circuitry 230 of FIG. 2, which can adjust the audio stream from the user device 104 associated with the interrupt attempt accordingly, as discussed further in association with FIG. 5. In some examples, the host interruption notification circuitry 410 renders a preferred audio adjustment option to a display of the host device 102 based on preferred audio adjustments indicated by the respective user devices 104 associated with the interrupter, the speaker, and/or the listeners to the host device 102 such that the host can consider the preferred audio adjustment options when making a decision as to which audio adjustment option to utilize for a detected interruption attempt.

In some examples, the host interruption notification circuitry 410 tracks a quantity of interruption attempts associated with the respective user device 104 via the interruption tracking database 450. In some examples, the host interruption notification circuitry 410 can indicate the quantity of interruption attempts associated with the respective user device 104 in the notification rendered to the host device 102. In some examples, the host interruption notification circuitry 410 causes the host device 102 to play an audible alert in response to the interruption attempt occurring. In some examples, the host interruption notification circuitry 410 is instantiated by processor circuitry executing host interruption notification instructions and/or configured to perform operations such as those represented by the flowchart of FIG. 8.

The interruption notification circuitry 220 of FIG. 4 includes the interrupter notification circuitry 420 to render an interruption notification to the respective user device 104 from which the interruption attempt was detected. For example, the interrupter notification circuitry 420 can render a notification (e.g., a message, an alert, a banner, etc.) to a display of the respective user device 104 from which the interruption attempt was detected. In some examples, the interrupter notification circuitry 420 renders an audible alert to the respective user device 104 from which the interruption attempt was detected to ensure that the associated user is aware that the interruption attempt was detected. In some examples, the interrupter notification circuitry 420 renders audio adjustment options to the respective user device 104 associated with the interrupter to enable the interrupter to indicate a manner according to which the interrupter prefers the audio from the interruption attempt be presented. For example, the interrupter notification circuitry 420 can provide selectable options to the respective user device 104 associated with the interrupter, such as an ignore option, a record and present at a later instance option, a record and present as text option, and/or a spatialize option. In turn, the example interrupter notification circuitry 420 can indicate the preferred audio adjustment option of the interrupter to the host interruption notification circuitry 410, which enables the host to consider the preference of the interrupter when determining an adjustment for the interruption attempt. In some examples, the interrupter notification circuitry 420 indicates the manner according to which the interruption circuitry 108 is adjusting the audio from the user device 104 to the respective user device 104 associated with the interruption attempt. In some examples, the interrupter notification circuitry 420 is instantiated by processor circuitry executing interrupter notification instructions and/or configured to perform operations such as those represented by the flowchart of FIG. 8.

The interruption notification circuitry 220 of FIG. 4 includes the speaker interruption notification circuitry 430 to render an interruption notification to the respective user device 104 providing audio being presented in the virtual meeting during the interruption attempt. As a result, the speaker interruption notification circuitry 430 notifies the user associated with the respective user device 104 (e.g., the speaker) of the interruption attempt. In some examples, the speaker interruption notification circuitry 430 renders user information associated with the interrupter to the user device 104. In some examples, the speaker interruption notification circuitry 430 renders the audio adjustment options to the respective user device 104 associated with the speaker to enable the speaker to indicate a manner according to which the speaker prefers the audio from the interruption attempt be presented. In some examples, the speaker interruption notification circuitry 430 indicates the manner according to which the interruption audio is being modified to the user device 104 associated with the speaker. In some examples, the speaker interruption notification circuitry 430 is instantiated by processor circuitry executing speaker interruption notification instructions and/or configured to perform operations such as those represented by the flowchart of FIG. 8.

The interruption notification circuitry 220 of FIG. 4 includes the listener interruption notification circuitry 440 to render an interruption notification to the respective user devices 104 that are not attempting to provide audio in the virtual meeting (e.g., listeners). In some examples, the listener interruption notification circuitry 440 renders user information associated with the interrupter to the user devices 104 of the listeners. In some examples, the listener interruption notification circuitry 440 renders the audio adjustment options to the respective user devices 104 associated with the listeners to enable the respective listeners to indicate a manner according to which the respective listeners prefer the audio from the interruption attempt be presented. In some examples, the listener interruption notification circuitry 440 indicates the manner according to which the audio forming the interruption attempt is being modified to the user devices 104 associated with the listeners. In some examples, the listener interruption notification circuitry 440 is instantiated by processor circuitry executing listener interruption notification instructions and/or configured to perform operations such as those represented by the flowchart of FIG. 8.

The interruption notification circuitry 220 of FIG. 4 includes the example interruption tracking database 450 to enable tracking of interruption attempts from the respective user devices 104.

The interruption notification circuitry 220 of FIG. 4 includes the example interruption control settings database 360 to enable interruption audio adjustment options and/or interruption notifications to be identified by the example host interruption notification circuitry 410, the example interrupter notification circuitry 420, the example speaker interruption notification circuitry 430, and/or the example listener interruption notification circuitry and, in turn, rendered to the host device 102 and/or the user devices 104.

FIG. 5 is a block diagram of example interruption control circuitry 230 of FIG. 2. The example interruption control circuitry 230 of FIG. 5 may be instantiated (e.g., creating an instance of, bring into being for any length of time, materialize, implement, etc.) by processor circuitry such as a central processing unit executing instructions. Additionally or alternatively, the example interruption control circuitry 230 of FIG. 5 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 5 may, thus, be instantiated at the same or different times. Some or all of the circuitry may be instantiated, for example, in one or more threads executing concurrently on hardware and/or in series on hardware. Moreover, in some examples, some or all of the circuitry of FIG. 5 may be implemented by microprocessor circuitry executing instructions to implement one or more virtual machines and/or containers. In the illustrated example of FIG. 5, the interruption control circuitry 230 includes example interruption settings circuitry 510, example interrupter mute circuitry 520, example interrupter audio record circuitry 530, example interrupter recording presentation circuitry 540, example audio spatialization circuitry 550, example interrupter audio delay circuitry 560, an example recording buffer 570, an example recording queue 580, and the example interruption control settings database 360.

The interruption control circuitry 230 of FIG. 5 includes the interruption settings circuitry 510 to control audio adjustments utilized and/or notifications rendered in response to an interruption attempt being detected by the interruption detection circuitry of FIGS. 2 and 3. For example, the interruption settings circuitry 510 can store settings the interruption control settings database 360 based on the audio adjustments to be utilized and/or the notifications to be rendered in response an interruption attempt being detected. Specifically, the example interruption settings circuitry 510 can determine whether audio of the interruption attempt is to be muted, recorded, spatialized, and/or delayed. In some examples, in response to determining the audio is to be muted and recorded, the interruption settings circuitry 510 can determine a manner in which the recording is to be presented. For example, the interruption settings circuitry 510 can determine the recording is to be presented as text transmitted to the host device 102 and/or one or more of the user devices 104 in the virtual meeting.

In some examples, the interruption settings circuitry 510 renders the interruption control options to the host device 102 during, at a start of, and/or in advance of the virtual meeting. In turn, the example interruption settings circuitry 510 can control the audio adjustments utilized for audio defining interruption attempts and/or control the notifications rendered in response to the interruption attempts based on the interruption control options selected at the host device 102.

In some examples, the interruption settings circuitry 510 configures the interruption control settings for the respective user devices 104 on a per-user basis. In some examples, the interruption settings circuitry 510 causes the implemented audio adjustments and/or rendered notifications to be based on a performance history for the respective user device 104 that attempted the interruption. For example, the interruption settings circuitry 510 can configure the audio adjustments such that attempted interruption audio from the user devices 104 is to be spatialized in response to the respective user device 104 attempting two (2) or fewer interruptions while any subsequent audio of any subsequent interruption attempt is to be muted. In some examples, the interruption settings circuitry 510 is instantiated by processor circuitry executing interruption settings instructions and/or configured to perform operations such as those represented by the flowchart of FIG. 9.

The interruption control circuitry 230 of FIG. 5 includes the example interrupter mute circuitry 520 to mute the audio of the interruption attempt. For example, the interrupter mute circuitry 520 can prevent the audio defining the interruption attempt from being presented in the virtual meeting in response to the interruption settings circuitry 510 and/or the interruption control settings database 360 indicating that the interruption attempt is to be muted. In some examples, the interrupter mute circuitry 520 is instantiated by processor circuitry executing interrupter mute instructions and/or configured to perform operations such as those represented by the flowchart of FIG. 9.

The interruption control circuitry 230 of FIG. 5 includes the example interrupter audio record circuitry 530 to record audio from the respective user device 104 and/or the host device 102 that attempted the interruption the interruption attempt. For example, in response to detecting a start of the interruption attempt, the interrupter audio record circuitry

530 can begin recording the audio from the respective user device 104 associated with the interruption attempt.

To avoid missing an initial period of the audio of the interruption attempt in the recording, the example interrupter audio recording circuitry 530 can extract a sequence of the audio from the respective user device 104 or the host device 102 via the recording buffer 570. For example, the recording buffer 570 can be a circular buffer that records a predetermined period (e.g., 2 seconds, 5 seconds, 10 seconds, etc.) of the incoming audio from the user devices 104 and the host device 102, respectively, while overriding the previously recorded audio in a loop. In turn, the example interrupter audio record circuitry 530 can identify a time of a start of the recording and obtain a sequence of the audio stream that spans from the start time of the recording to a period a predetermined amount of time (e.g., 0.1 seconds, 0.5 seconds, 1 second, etc.) before the start of the recording via the recording buffer 570 to ensure a beginning portion of the audio defining the interruption attempt is not left out of the recording.

Further, the example interrupter audio record circuitry 530 can store the recorded audio of the interruption attempt as a data stream in the recording queue 580. Specifically, the example interrupter audio record circuitry 530 can store a first sequence of the interruption attempt audio obtained from the interrupter via the recording buffer 570 followed by a second sequence of the interruption attempt audio recorded by the interrupter audio record circuitry 530. In some examples, the interrupter audio record circuitry 530 causes the interrupter notification circuitry 220 (FIG. 2) to prompt the respective user device 104 or the host device 102 associated with the interruption attempt to indicate whether the recording is to be presented. In response to the user of the respective user device 104 indicating that the recording is not to be presented, the example interrupter notification circuitry 220 can alert the interrupter audio record circuitry 530, which can delete the recording in the recording queue 580. In some examples, the interrupter audio record circuitry 530 is instantiated by processor circuitry executing interrupter audio record instructions and/or configured to perform operations such as those represented by the flowchart of FIG. 9.

The interruption control circuitry 230 of FIG. 5 includes the example interrupter recording presentation circuitry 540 to present the interruption in response to the interruption being stored in the recording queue 580. For example, the interrupter recording presentation circuitry 540 can identify a manner according to which the recording is to be presented based on a communication from the interruption settings circuitry 510 and/or settings stored in the interruption control settings database 360. In some examples, the interrupter recording presentation circuitry 540 causes the interruption to be presented in an audio format immediately after the presentation time associated with audio being presented in the virtual meeting concludes. In some examples, the interrupter recording presentation circuitry 540 causes the interruption to be presented in the audio format during a predetermined period of the virtual meeting (e.g., during a Q&A period). In some examples, the interrupter recording presentation circuitry 540 causes the interruption to be audibly presented in response to an indication from the user of the host device 102.

In some examples, the interrupter recording presentation circuitry 540 transcribes the recording to generate text corresponding thereto. In such examples, the interrupter recording presentation circuitry 540 renders the text to certain devices in the virtual meeting, such as the host device

102 and/or the user device 104 associated with the initial speaker. In some examples, the interrupter recording presentation circuitry 540 causes the text to be presented in a chat window for all participants in the virtual meeting to read. In some examples, the interrupter recording presentation circuitry 540 is instantiated by processor circuitry executing interrupter recording presentation instructions and/or configured to perform operations such as those represented by the flowchart of FIG. 9.

The interruption control circuitry 230 of FIG. 5 includes the example audio spatialization circuitry 550 to spatialize the audio encountered during the interruption attempt. Additionally, the audio spatialization circuitry 550 can spatialize the audio being presented initially when the interruption attempt was encountered. For example, when presented at the other user devices 104 and the host device 102, the audio spatialization circuitry 550 can cause the audio from the interrupting user device 104 to be presented through a first audio channel while the audio from the non-interrupting user device 104 is presented through a second audio channel. As a result, the users of the other user devices 104 and/or the host device 102 can perceive the audio as being presented from different locations in a three-dimensional environment, which enables the audio from both the interrupting user device 104 and the non-interrupting user device 104 to be more easily understood. Thus, the audio from the initial speaker and the audio from the interrupter can be heard and understood by the participants in the virtual meeting despite the interruption. In some examples, the audio spatialization circuitry 550 is instantiated by processor circuitry executing audio spatialization instructions and/or configured to perform operations such as those represented by the flowchart of FIG. 9.

The interruption control circuitry 230 of FIG. 5 includes the example interrupter audio delay circuitry 560 to delay a presentation of the audio from the attempted interruption. For example, the interrupter audio delay circuitry 560 can suspend or pause the audio from the interruption attempt until the presentation of the audio being presented concludes. In some examples, the interrupter audio delay circuitry 560 is instantiated by processor circuitry executing interrupter audio delay instructions and/or configured to perform operations such as those represented by the flowchart of FIG. 9.

The interruption control circuitry 230 of FIG. 5 includes the example recording buffer 570 to record a period of audio captured by the respective user device 104 and/or the host device 102. For example, the recording buffer 570 can be a circular buffer that stores respective audio recordings for audio most recently encountered at the respective user devices 104 and/or the host device 102. As a result, the example recording buffer 570 enables the interrupter audio record circuitry 530 to generate a recording of the interruption attempt audio without missing an initial period of the audio (e.g., a period between a start of the interruption attempt and a start of the interrupter audio record circuitry 530 starting to record the respective user device 104 or the host device associated with the interruption attempt).

The interruption control circuitry 230 of FIG. 5 includes the recording queue 580 to store recordings to be presented in the virtual meeting. For example, in response to the interrupter audio record circuitry 530 generating a recording to be presented at a subsequent time in the virtual meeting, the interrupter audio record circuitry 530 can store the recording in the recording queue. Further, the recording queue 580 can organize the recordings in an order that the recordings are to be presented. In turn, the example interrupter recording presentation circuitry 540 can present the recordings in the order that the recordings are stored in the example recording queue 580.

The interruption control circuitry 230 of FIG. 5 includes the example interruption control settings database 360 to store settings according to which interruption attempts are to be handled. In some examples, the interrupter mute circuitry 520 determines whether to mute the respective user device 104 or the host device 102 associated with the interruption attempt based on the settings stored in the interruption control settings database 360. In some examples, the interrupter audio record circuitry 530 determines whether to record the audio defining the interruption attempt based on the settings stored in the interruption control settings database 360. In some examples, the interrupter recording presentation circuitry 540 determines when to present the recordings of the interruption attempts and/or determines a format for the recordings to be presented based on the settings stored in the interruption control settings database 360. In some examples, the audio spatialization circuitry 550 determines whether to spatialize the audio defining the interruption attempt and/or the non-interrupting audio based on the settings stored in the interruption control settings database 360. In some examples, the interrupter audio delay circuitry 560 determines whether to delay a presentation of the audio defining the interruption attempt and/or a duration of the delay based on the settings stored in the interruption control settings database 360.

Figure 6:
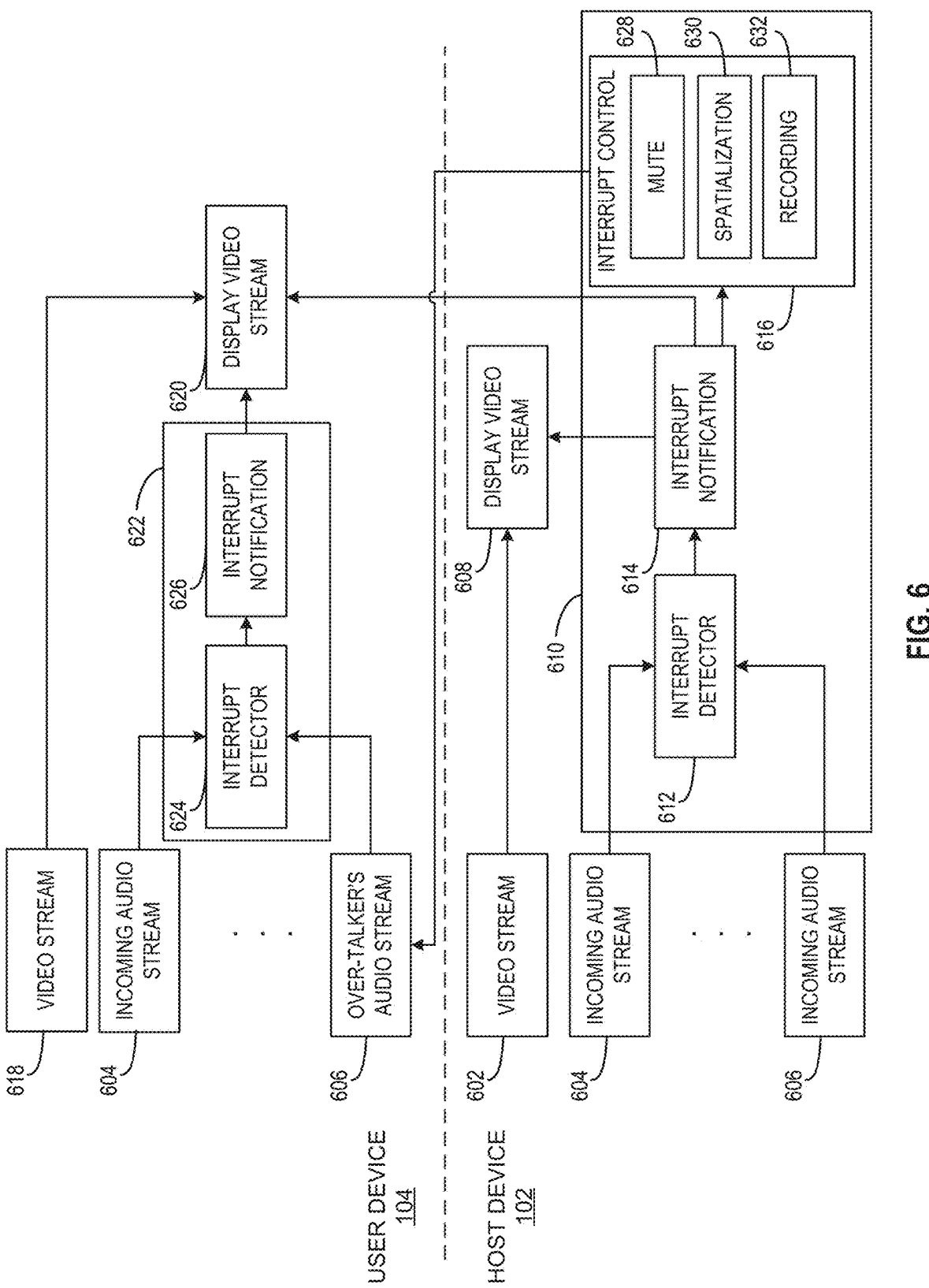
FIG. 6 is a schematic process flow of example operations associated with example interruption circuitry of FIG. 2 in the example remote discussion platform of FIG. 1.

FIG. 6 is a schematic process flow of example operations associated with the example interruption circuitry 108 of the host device 102 and the example interruption circuitry 108 of one of the user devices 104 in the example virtual meeting platform 100. In the illustrated example of FIG. 6, the host device 102 includes a first example video stream 602, a first example first incoming audio stream 604, a second example incoming audio stream 606, a first example display video stream 608, and example host interruption circuitry 610 (e.g., the interruption circuitry 108). The example host interruption circuitry 610 includes a first example interrupt detector 612 (e.g., the interruption detection circuitry 210 of FIGS. 2 and 3), a first example interrupt notification 614 (e.g., the interruption notification circuitry 220 of FIGS. 2 and 4), and an example interrupt control 616 (e.g., the interruption control circuitry 230 of FIGS. 2 and 5). In the illustrated example of FIG. 6, the user device 104 includes a second example video stream 618, the first example incoming audio stream 604, the second example incoming audio stream 606, a second example display video stream 620, and example user interruption circuitry 622 (e.g., the interruption circuitry 108). The example user interruption circuitry 622 includes a second example interrupt detector 624 (e.g., the interruption detection circuitry 210 of FIGS. 2 and 3) and a second example interrupt notification 626 (e.g., the interruption notification circuitry 22d0 of FIGS. 2 and 4). In some examples, the host interruption circuitry 610 and the user interruption circuitry 622 are instantiated by processor circuitry executing interruption instructions and/or configured to perform operations, such as those represented by the flowcharts of FIGS. 7-9.

In the illustrated example of FIG. 6, the example host device 102 and the example user device 104 capture the first example video stream 602 and the second example video stream 618, respectively. For example, respective cameras associated with the host device 102 and the user device can capture the video streams 602, 618. In turn, the example host device 102 and the example user device 104 can present the respective video streams via the first display video stream

608 and the second display video stream 620, both of which can be displayed in a virtual meeting.

In the illustrated example of FIG. 6, the host device 102 and the user device 104 receive the first example incoming audio stream 604. Further, the example host device 102 receives the second example incoming audio stream 606. In this example, the user device 104 generates the second example incoming audio stream 606 and, thus, is interrupting the user associated with the first example incoming audio stream 604.

The first example interrupt detector 612 and the second example interrupt detector 624 of FIG. 6 can detect which of the incoming audio streams 604, 606 is an interruption attempt. For example, the interrupt detectors 612 can track a presentation time associated with the first incoming audio stream 604 in response to the first incoming audio stream 604 beginning at a time that does not cause an interruption and continuing without any pauses that are greater than a threshold duration. Further, the example interruption detectors 612, 624 can determine the second incoming audio stream 606 is an interruption in response to a start of the second incoming audio stream 606 occurring during the presentation time associated with the first incoming audio stream 604. In some examples, in response to the first incoming audio stream 604 and the second incoming audio stream 606 being combined into a single audio stream, the interrupt detectors 612, 624 identify separate voices within the audio stream and determine respective devices associated with the audio based on voice recognition. In turn, the interrupt detectors 612, 624 can determine a first voice is interrupting a second voice in response to a presentation time associated with the second voice being active when a presentation of the second voice begins.

In response to detecting the interruption, the first example interrupt detector 612 can cause a signal indicative of the interruption attempt occurring as well as the device that attempted the interruption (e.g., the user device 104) to be transmitted to the first example interrupt notification 614. Similarly, the second example interrupt detector 624 can transmit a signal indicative of the interruption attempt originating from the user device 104 to the second example interrupt notification 626.

The first example interrupt notification 614 of FIG. 6 generates a notification (e.g., a message, a visual indicator, etc.) and causes the notification to be transmitted to the second display video stream 620. The first example interrupt notification 614 causes the display video stream 608 to render a visual indication that the interruption attempt was encountered and a user associated with the interruption attempt. In some examples, the first interrupt notification 614 prompts a host associated with the host device 102 to input a message to be provided to the second display video stream 620. In turn, the example first interrupt notification 614 can transmit the message to the display video stream 620 of the user device 104. Further, the first example interrupt notification 614 causes a signal indicative of the interruption attempt occurring as well as the device that attempted the interruption (e.g., the user device 104) to be transmitted to the interrupt control 616.

The second example interrupt notification 626 of FIG. 6 renders an alert to the user associated with the user device 104 via the display video stream 620. For example, the alert can indicate that the user talking at the given moment is interrupting another speaker.

The example interrupt control 616 of FIG. 6 controls the second incoming audio stream 606. For example, the interrupt control 616 can cause a mute function 628 (e.g., the interrupter mute circuitry 520 of FIG. 5), a spatialization function 630 (e.g., the audio spatialization circuitry 550 of FIG. 5), and/or a recording function 632 (e.g., the interrupter audio record circuitry 530 and the interrupter recording presentation circuitry 540) to modify the second incoming audio stream 606. In some examples, the interrupt control 616 renders the control options to the display video stream 608 to enable the host to select a manner according to which the interruption attempt is to be handled. In turn, the interrupt control 616 can control a manner in which the second incoming audio stream 606 (i.e., the over-talker's audio stream) is rendered at the user device 104.

In some examples, the interruption circuitry 108 includes means for detecting an interruption attempt. For example, the means for detecting may be implemented by the interruption detection circuitry 210. In some examples, the interruption detection circuitry 210 may be instantiated by processor circuitry such as the example processor circuitry 1012 of FIG. 10. For instance, the interruption detection circuitry 210 may be instantiated by the example microprocessor 1100 of FIG. 11 executing machine executable instructions such as those implemented by at least blocks 702, 704, 706, 708, 710, 712, 714, 716, and/or 718 of FIG. 7. In some examples, the interruption detection circuitry 210 may be instantiated by hardware logic circuitry, which may be implemented by an ASIC, XPU, or the FPGA circuitry 1200 of FIG. 12 structured to perform operations corresponding to the machine readable instructions. Additionally or alternatively, the interruption detection circuitry 210 may be instantiated by any other combination of hardware, software, and/or firmware. For example, the interruption detection circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the interruption circuitry 108 includes means for rendering an interruption notification. For example, the means for rendering may be implemented by the interruption notification circuitry 220. In some examples, the interruption notification circuitry 220 may be instantiated by processor circuitry such as the example processor circuitry 1012 of FIG. 10. For instance, the interruption notification circuitry 220 may be instantiated by the example microprocessor 1100 of FIG. 11 executing machine executable instructions such as those implemented by at least blocks 802, 804, 806, 808, 810, and/or 812 of FIG. 8. In some examples, the interruption notification circuitry 220 may be instantiated by hardware logic circuitry, which may be implemented by an ASIC, XPU, or the FPGA circuitry 1200 of FIG. 12 structured to perform operations corresponding to the machine readable instructions. Additionally or alternatively, the interruption notification circuitry 220 may be instantiated by any other combination of hardware, software, and/or firmware. For example, the interruption notification circuitry 220 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the interruption circuitry 108 includes means for adjusting a playback or presentation of audio. For example, the means for adjusting may be implemented by the interruption control circuitry 230. In some examples, the interruption control circuitry 230 may be instantiated by processor circuitry such as the example processor circuitry 1012 of FIG. 10. For instance, the interruption control circuitry 230 may be instantiated by the example microprocessor 1100 of FIG. 11 executing machine executable instructions such as those implemented by at least blocks 902, 904, 906, 908, 910, 912, 914, 916, 918, 920, 922, and/or 924 of FIG. 9. In some examples, the interruption notification circuitry 220 may be instantiated by hardware logic circuitry, which may be implemented by an ASIC, XPU, or the FPGA circuitry 1200 of FIG. 12 structured to perform operations corresponding to the machine readable instructions. Additionally or alternatively, the interruption control circuitry 230 may be instantiated by any other combination of hardware, software, and/or firmware. For example, the interruption control circuitry 230 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the interruption circuitry 108 of FIG. 1 is illustrated in FIGS. 2-5, one or more of the elements, processes, and/or devices illustrated in FIGS. 2-5 may be combined, divided, re-arranged, omitted, eliminated, and/or implemented in any other way. Further, the example interruption detection circuitry 210, the example interruption notification circuitry 220, the example interruption control circuitry 230, the example audio monitor circuitry 310, the example speaker detection circuitry 320, the example speaker indication circuitry 330, the example pause-in-speech duration setting circuitry 340, the example interruption trigger circuitry 350, the example interruption control settings database 360, the example host interruption notification circuitry 410, the example interrupter notification circuitry 420, the example speaker interruption notification circuitry 430, the example listener interruption notification circuitry 440, the example interruption tracking database 450, the example interruption settings circuitry 510, the example interrupter mute circuitry 520, the example interrupter audio record circuitry 530, the example interrupter recording presentation circuitry 540, the example audio spatialization circuitry 550, the example interrupter audio delay circuitry 560, the example recording buffer 570, the example recording queue 580 and/or, more generally, the example interruption circuitry 108 of FIG. 1, may be implemented by hardware alone or by hardware in combination with software and/or firmware. Thus, for example, any of the example interruption detection circuitry 210, the example interruption notification circuitry 220, the example interruption control circuitry 230, the example audio monitor circuitry 310, the example speaker detection circuitry 320, the example speaker indication circuitry 330, the example pause-in-speech duration setting circuitry 340, the example interruption trigger circuitry 350, the example interruption control settings database 360, the example host interruption notification circuitry 410, the example interrupter notification circuitry 420, the example speaker interruption notification circuitry 430, the example listener interruption notification circuitry 440, the example interruption tracking database 450, the example interruption settings circuitry 510, the example interrupter mute circuitry 520, the example interrupter audio record circuitry 530, the example interrupter recording presentation circuitry 540, the example audio spatialization circuitry 550, the example interrupter audio delay circuitry 560, the example recording buffer 570, the example recording queue 580 and/or, more generally, the example interruption circuitry 108, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example interruption circuitry 108 of FIG. 1 may include one or more elements, processes, and/or devices in addition to, or instead of, those illustrated in FIGS. 2-5, and/or may include more than one of any or all of the illustrated elements, processes and devices.

Figure 7:
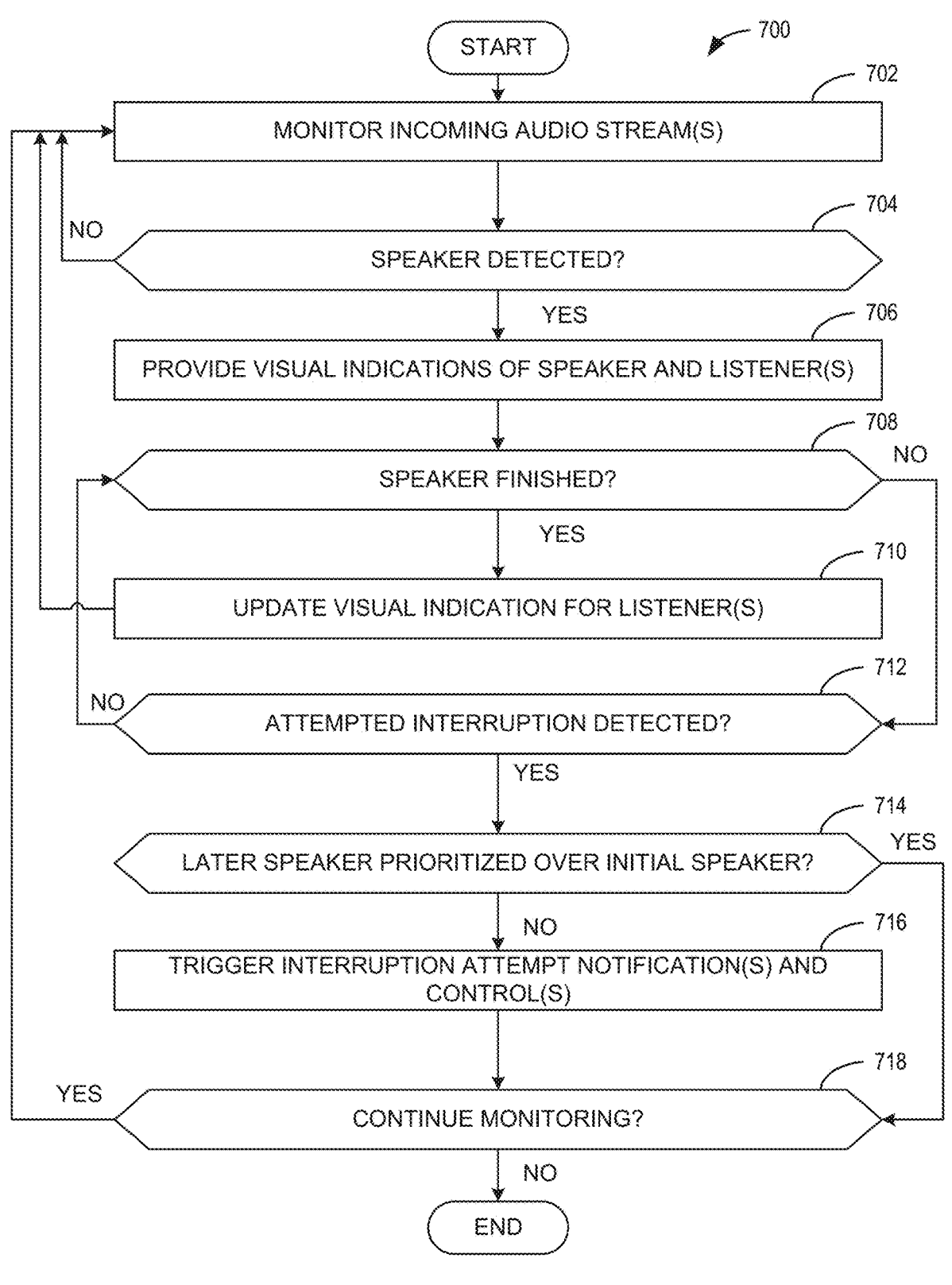
FIG. 7 is a flowchart representative of example machine readable instructions and/or example operations that may be executed by example processor circuitry to implement the example interruption detection circuitry of FIGS. 2 and 3.
Figure 8:
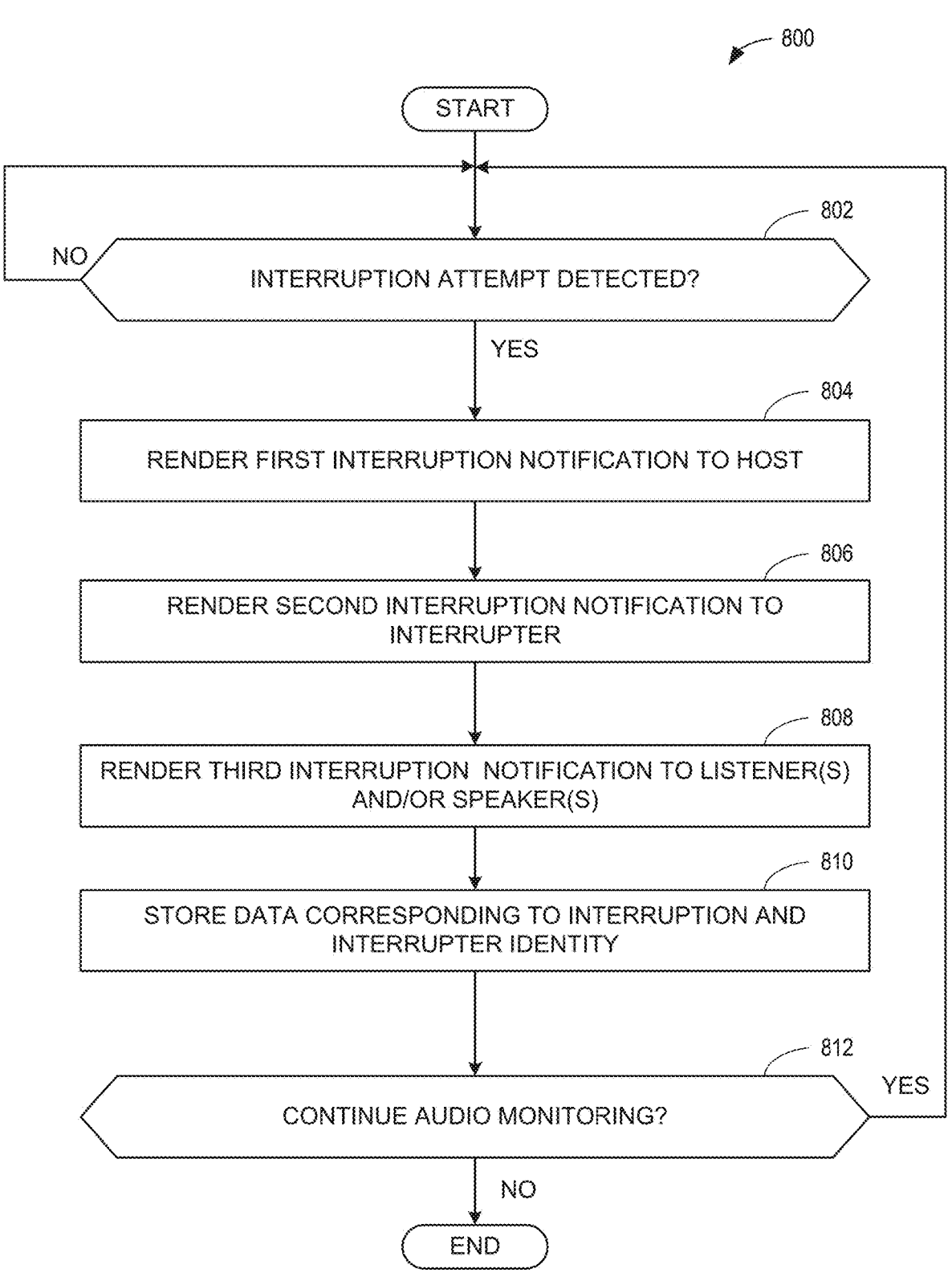
FIG. 8 is a flowchart representative of example machine readable instructions and/or example operations that may be executed by example processor circuitry to implement the example interruption notification circuitry of FIGS. 2 and 4.
Figure 9:
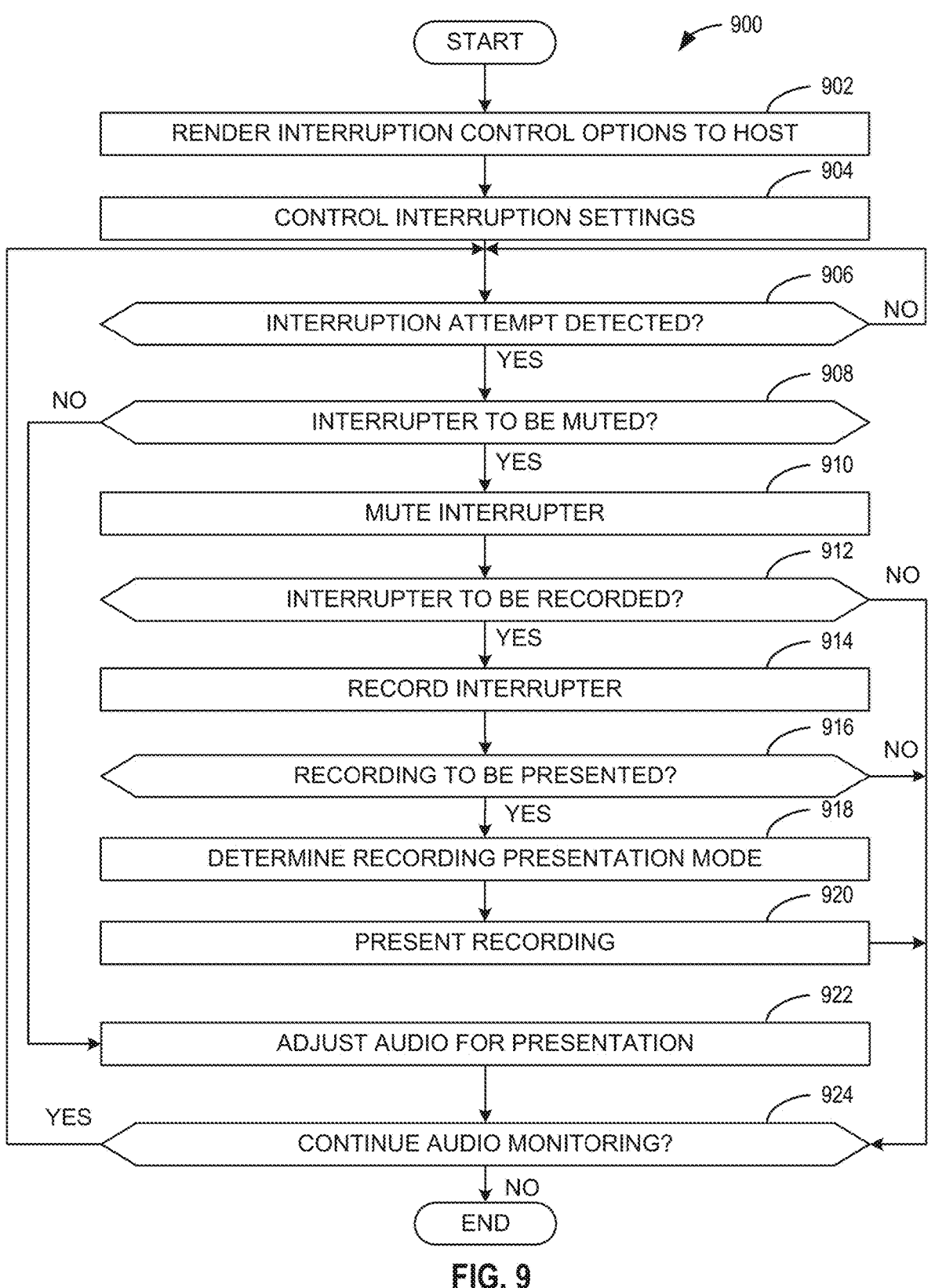
FIG. 9 is a flowchart representative of example machine readable instructions and/or example operations that may be executed by example processor circuitry to implement the example interruption control circuitry of FIGS. 2 and 5.

A flowchart representative of example machine readable instructions, which may be executed to configure processor circuitry to implement the interruption circuitry 108 of FIG. 2, is shown in FIGS. 7-9. The machine readable instructions may be one or more executable programs or portion(s) of an executable program for execution by processor circuitry, such as the processor circuitry 1012 shown in the example processor platform 1000 discussed below in connection with FIG. 10 and/or the example processor circuitry discussed below in connection with FIGS. 11 and/or 12. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 7-9, many other methods of implementing the example interruption circuitry 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 7-9 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 7 is a flowchart representative of example machine readable instructions and/or example operations 700 that may be executed and/or instantiated by processor circuitry to detect interruptions in a multi participant conversation. The machine readable instructions and/or the operations 700 of FIG. 7 begin at block 702, at which the interruption circuitry 108 (FIGS. 1 and 2) monitors one or more incoming audio streams. For example, the interruption detection circuitry 210 (FIGS. 2 and 3) can monitor the incoming audio stream(s) of the host device 102 (FIGS. 1 and 6) and/or the respective user devices 104 (FIGS. 1 and 6). In some examples, the audio monitor circuitry 310 (FIG. 3) monitors the incoming audio stream(s).

At block 704, the interruption circuitry 108 determines whether a speaker is detected in the incoming audio stream(s). For example, the interruption detection circuitry 210 can determine whether there is activity in the incoming audio stream(s). In some examples, the speaker detection circuitry 320 (FIG. 3) determines the host device 102 generated the activity in the incoming audio stream(s) and, thus, the user associated with the host device 102 is the speaker. In some examples, the speaker detection circuitry 320 determines which of the respective user devices 104 generated the activity in the incoming audio stream(s) and, in turn, determines the speaker is the user associated with the respective user device that generated the activity in the audio streams. For example, in response to respective audio streams being assigned to the host device 102 and the respective user device 104, the speaker detection circuitry 320 can determine the speaker based on the respective audio stream from which the activity is detected. Alternatively, in response to the host device 102 and the respective user devices 104 merging audio into a single audio stream, the speaker detection circuitry 320 can identify a voice in the audio stream and correlate the voice with voice samples from the users associated with the host device 102 and the respective user devices 104 to determine the speaker.

At block 706, the interruption circuitry 108 renders visual symbols indicative of who is the speaker and who is/are the listener(s). For example, the interruption detection circuitry 210 can render a first visual symbol (e.g., a green light) to an area of a display associated with the speaker and render a second visual symbol (e.g., a red light) to another area(s) of the display associated with the listeners. In some examples, the speaker indication circuitry 330 (FIG. 3) renders the visual symbols to the host device 102 and the respective user devices 104 to indicate who is permitted to be a speaker in a virtual meeting at a given moment and/or who is restricted to a listener in the virtual meeting at the given moment.

At block 708, the interruption circuitry 108 determines whether the speaker is finished speaking. For example, the interruption detection circuitry 210 can determine whether a presentation time associated with the audio stream from the host device 102 or the respective user device 104 associated with the speaker is concluded. In some examples, the pause-in-speech duration setting circuitry 340 sets a threshold period corresponding to a length of time where a participant to remain the identified speaker at the given moment without presenting audio (e.g., while silent) to enable the speaker to pause without being interrupted. In turn, the example speaker detection circuitry 320 can determine the presentation time associated with the speaker is concluded in response to the speaker not presenting audio for at least the threshold period. In response to the speaker being finished speaking, the operations 700 proceed to block 710. On the other hand, in response to the speaker not being finished speaking and a presentation time for the speaker continuing, the operations 700 skip to block 712.

At block 710, the interruption circuitry 108 updates the visual symbols indicative of the speaker and the listeners in the virtual meeting. For example, the interruption detection circuitry 210 can render the first visual symbol (e.g., the green light) to areas of the display associated with the respective participants in the virtual meeting to alert the participants that speaking is permitted at the given moment. In some examples, the speaker indication circuitry 330 renders the first visual symbols to areas of the displays of the host device 102 and the respective user devices 104 to indicate that the previously active speaker is finished speaking and other participants are permitted to speak.

At block 712, the interruption circuitry 108 determines whether an interruption attempt is detected. For example, the interruption detection circuitry 210 can detect an interruption attempt in response to detecting activity in an incoming audio stream from another user device 104 or the host device 102 during the presentation time associated with the identified speaker. In some examples, the interruption trigger circuitry 350 (FIG. 3) can determine the interruption attempt has occurred and identify the respective user device 104 or the host device 102 attempting the interruption. For example, in response to the speaker detection circuitry 320 identifying first detected audio from a first one of the user devices 104 (e.g., USER DEVICE 1) or the host device 102 and subsequently identifying second detected audio from a second one of the user devices 104 (e.g., USER DEVICE 2) or the host device 102 without detecting that the first detected audio has stopped for at least the threshold period set by the pause-in-speech duration setting circuitry 340, the interruption trigger circuitry 350 can determine the second one of the user devices 104 is attempting to interrupt. In some examples, the interruption trigger circuitry 350 determines there is no interruption attempt in response to the speaker detection circuitry 320 not detecting audio from another user device 104 or the host device 102 during the presentation time associated with the identified speaker. In response to an interruption attempt being detected, the operations 700 proceed to block 714. Otherwise, the operations 700 proceed to block 708.

At block 714, the interruption circuitry 108 determines whether the later speaker is prioritized over the initial speaker. For example, the interruption detection circuitry 210 can determine whether the user device 104 or the host device 102 attempting to interrupt is prioritized over the user device 104 or the host device 102 associated with the audio being presented. In some examples, the interruption trigger circuitry 350 performs a look-up of a prioritization of the respective user devices 104 and/or the host device 102 associated with the initial speaker and the later speaker in the interruption control settings database 360 to determine whether the later speaker is prioritized over the initial speaker. In response to data in the interruption control settings database 360 indicating that the later speaker is prioritized over the initial speaker, the operations 700 skip to block 718. Otherwise, the operations 700 proceed to block 716.

At block 716, the interruption circuitry 108 triggers one or more interruption attempt notification(s) and/or control(s). For example, the interruption detection circuitry 210 can transmit a signal indicative of the interruption attempt and the respective user device 104 or the host device 102 associated with the interruption attempt to the interruption notification circuitry 220 (FIGS. 2 and 4) and the interruption control circuitry 230 (FIGS. 2 and 4). In some examples, the interruption trigger circuitry 350 causes the interruption attempt to be indicated to the interruption notification circuitry 220 and/or the interruption control circuitry 230. In turn, the example interruption notification circuitry 220 can render the interruption attempt notification(s) to the host device 102 and/or one or more of the user devices 104, as discussed further in association with FIG. 8. Further, the example interruption control circuitry 230 can control a manner of rendering the audio of the interruption attempt, as discussed further in association with FIG. 9.

At block 718, the interruption circuitry 108 determines whether to continue monitoring. For example, the interruption detection circuitry 210 can determine whether to continue to monitor the incoming audio in the virtual meeting. To continue monitoring, the operations 700 return to block 702. Otherwise, the operations 700 terminate.

FIG. 8 is a flowchart representative of example machine readable instructions and/or example operations 800 that may be executed and/or instantiated by processor circuitry to render interruption notifications for participants in a conversation. The machine readable instructions and/or the operations 800 of FIG. 8 begin at block 802, at which the interruption circuitry 108 (FIGS. 1 and 2) determines whether an interruption attempt has been detected. For example, the interruption notification circuitry 220 (FIGS. 2 and 4) can determine whether a signal indicative of an interruption attempt occurring has been received from the interruption detection circuitry 210 (FIGS. 2 and 3). In response to an interruption attempt being detected, the operations 800 proceed to block 804. Otherwise, the operations repeat block 802.

At block 804, the interruption circuitry 108 renders a first interruption notification to the host device 102. For example, the interruption notification circuitry 220 can cause the first interruption notification to be rendered to the host device 102. In some examples, the host interruption notification circuitry 410 (FIG. 4) renders a visual notification (e.g., a message, an alert, a banner, etc.) to a display of the host device 102. In some examples, the visual notification includes interruption control options from which the host can select to cause the interruption control circuitry 230 (FIGS. 2 and 5) to control the audio associated with the interruption attempt in a certain manner, as discussed further in association with FIG. 9. In some examples, the host interruption notification circuitry 410 (FIG. 4) renders an audible notification to the host device 102. In some examples, the visual notification and/or the audible notification indicates the respective user device 104 from which the interruption attempt was detected. In some examples, the host interruption notification circuitry 410 determines the notification to present to the host device 102 based on settings in the interruption control settings database 360 (FIGS. 3-5).

At block 806, the interruption circuitry 108 renders a second interruption notification to the respective user device 104 associated with the interruption attempt. For example, the interruption notification circuitry 220 can cause the second interruption notification to be rendered to the respective user device 104 that attempted the interruption. In some examples, the interrupter notification circuitry 420 (FIG. 4) renders the second interruption notification to a display and/or a speaker of the respective user device 104 that attempted the interruption. In some examples, the second interruption notification indicates a manner according to which the audio from the attempted interruption is being modified. In some examples, in response to the audio from the attempted interruption being recorded for a subsequent presentation, the second interruption notification prompts the interrupter to indicate a preference regarding when and/or a format according to which the subsequent presentation is to occur. In some examples, the interrupter notification circuitry 420 determines the notification to present to the respective user device 104 that attempted the interruption based on settings in the interruption control settings database 360.

At block 808, the interruption circuitry 108 renders a third interruption notification to one or more of the other user devices 104 (e.g., the listener(s) and/or the initial speaker in the virtual meeting). For example, the interruption notification circuitry 220 can cause the third interruption notification to be rendered to one or more other user device(s) 104 associated with the initial speaker and/or listener(s) in the conversation. In some examples, the speaker interruption notification circuitry 430 (FIG. 4) renders the third interruption notification to the respective user device 104 providing audio to the conversation during the interruption attempt. In some examples, the listener interruption notification circuitry 440 (FIG. 4) renders the third interruption notification to the respective user device(s) 104 that are not providing, or attempting to provide, audio to the conversation. In some examples, the third interruption notification indicates user information associated with the respective user device 104 that attempted the interruption to enable the speaker and/or the listener(s) in the conversation to evaluate the interruption attempt. In some examples, the speaker interruption notification circuitry 430 and/or the listener interruption notification circuitry 440 determines the notification to present to the respective user devices 104 associated with the speaker and/or the listeners in the conversation based on settings in the interruption control settings database 360.

At block 810, the interruption circuitry 108 stores data corresponding to the interruption attempt and the identity of the interrupter. For example, the interruption notification circuitry 220 can track interruption attempts encountered from the respective user devices 104 and/or the host device 102. In some examples, the host interruption notification circuitry 410 tracks a quantity of interruption attempts associated with the respective user device 104 via the interruption tracking database 450. In some examples, the host interruption notification circuitry 410 tracks the quantity of interruption attempts per conversation or across multiple conversations that occur at different times.

At block 812, the interruption circuitry 108 determines whether to continue monitoring. For example, the interruption notification circuitry 220 can determine whether to continue monitoring. To continue monitoring, the operations 800 return to block 802. Otherwise, the operations 800 terminate.

FIG. 9 is a flowchart representative of example machine readable instructions and/or example operations 900 that may be executed and/or instantiated by processor circuitry to control interrupting audio in a multi participant conversation. The machine readable instructions and/or the operations 900 of FIG. 9 begin at block 902, at which the interruption circuitry 108 (FIGS. 1 and 2) render control options to the host device 102 (FIGS. 1 and 6). For example, the interruption control circuitry 230 (FIGS. 2 and 5) can render the control options to the host device 102. In some examples, the interruption settings circuitry 510 prompts user of the host device 102 to select preferred interruption settings.

At block 904, the interruption circuitry 108 controls the interruption settings. For example, the interruption control circuitry 230 can store the interruption settings to be utilized in the interruption control settings database 360. In some examples, the interruption settings circuitry 510 transmits at least one signal indicative of the settings to be utilized to control audio defining an interruption attempt to the interrupter mute circuitry 520 (FIG. 5), the interrupter audio record circuitry 530 (FIG. 5), the interrupter recording presentation circuitry 540 (FIG. 5), the audio spatialization circuitry 550 (FIG. 5), the interrupter audio delay circuitry 560 (FIG. 5), and/or the interruption control settings database 360. In some examples, the interruption settings circuitry 510 indicates notification settings selected by the host to the interruption control settings database 360.

At block 906, the interruption circuitry 108 determines whether an interruption attempt has been detected. For example, the interruption control circuitry 230 can determine whether a signal indicative of an interruption attempt occurring has been received from the interruption detection circuitry 210 (FIGS. 2 and 3). In response to an interruption attempt being detected, the operations 900 proceed to block 908. Otherwise, the operations repeat block 906.

At block 908, the interruption circuitry 108 determines whether the interrupter is to be muted. For example, the interruption control circuitry 230 can determine whether the interruption attempt is to be muted based on the settings stored in the interruption control settings database 360. In some examples, the interrupter mute circuitry 520 determines whether to mute the audio that defines the interruption attempt based on the signal(s) indicative of the settings to be utilized from the interruption settings circuitry 510.

At block 910, the interruption circuitry 108 mutes the interrupter. For example, the interruption control circuitry 230 can mute the respective user device 104 and/or the host device 102 communicating the interrupt attempt. In some examples, the interrupter mute circuitry 520 mutes the audio that defines the interruption attempt.

At block 912, the interruption circuitry 108 determines whether the interruption attempt is to be recorded. For example, the interruption control circuitry 230 can determine whether the interruption attempt is to be recorded based on the settings stored in the interruption control settings database 360. In some examples, the interrupter audio record circuitry 530 determines whether to record the audio that defines the interruption attempt based on the signal(s) indicative of the settings to be utilized from the interruption settings circuitry 510.

At block 914, the interruption circuitry 108 records the interrupter. For example, the interruption control circuitry 230 can record audio being captured by the respective user device 104 and/or the host device communicating the interrupt attempt. In some examples, the interrupter audio record circuitry 530 records the audio being communicated by the respective user device 104 or the host device 102 that triggered the interruption attempt. In some examples, the interrupter audio record circuitry 530 obtains an initial period of the recording via the recording buffer 570 (FIG. 5).

In some examples, in response to preparing the recording, the interrupter audio record circuitry 530 stores the recording in the recording queue 580 (FIG. 5) for a subsequent presentation.

At block 916, the interruption circuitry 108 determines whether the recording is to be presented. For example, the interruption control circuitry 230 can cause the interruption notification circuitry 220 to render a prompt to the respective user device 104 associated with the interruption attempt requesting whether a preference of the interrupter regarding whether the recording should be presented. In some examples, the interrupter recording presentation circuitry 540 determines whether the recording is to be presented based on an indication from the respective user device 104 associated with the interruption attempt. In response to determining the recording is to be presented, the operations 900 proceed to block 916. Otherwise, the operations 900 skip to block 924.

At block 918, the interruption circuitry 108 determines a recording presentation mode. For example, the interruption control circuitry 230 can determine a format according to which to present the recording at a subsequent instance based on the settings stored in the interruption control settings database 360. In some examples, the interrupter recording presentation circuitry 540 determines that the recording is to be presented in audibly or in a text format based on the signal(s) indicative of the settings to be utilized from the interruption settings circuitry 510. In some examples, in response to determining the recording is to be presented in a text format, the interrupter recording presentation circuitry 540 transcribes the recording to generate the corresponding text.

At block 920, the interruption circuitry 108 causes the recording to be presented. For example, the interruption control circuitry 230 can present the recording in the determined format. In some examples, the interrupter recording presentation circuitry 540 presents the recording audibly during a predetermined period of the conversation or at an instance when playing the recording would not interrupt another participant in the conversation. In some examples, the interrupter recording presentation circuitry 540 presents the text corresponding to the recording to one or more of the user devices 104 and/or the host device 102 in the conversation. In response to presenting the recording, the operations 900 skip to block 924.

At block 922, the interruption circuitry 108 adjusts the audio for presentation. For example, the interruption control circuitry 230 can spatialize and/or delay the audio for presentation in the conversation to enable the audio to be more easily understood. In some examples, to adjust the audio, the audio spatialization circuitry 550 spatializes the audio from the respective user device 104 and/or the host device 102 that defines the interruption attempt as well as the audio from the respective user device 104 and/or the host device associated with the speaker at the given instant. In some examples, to adjust the audio, the interrupter audio delay circuitry 560 delays a presentation of the audio from the respective user device 104 and/or the host device 102 that defines the interruption attempt.

At block 924, the interruption circuitry 108 determines whether to continue monitoring the audio. For example, the interruption control circuitry 230 can determine whether to continue monitoring. To continue monitoring, the operations 900 return to block 906. Otherwise, the operations 900 terminate.

Figure 10:
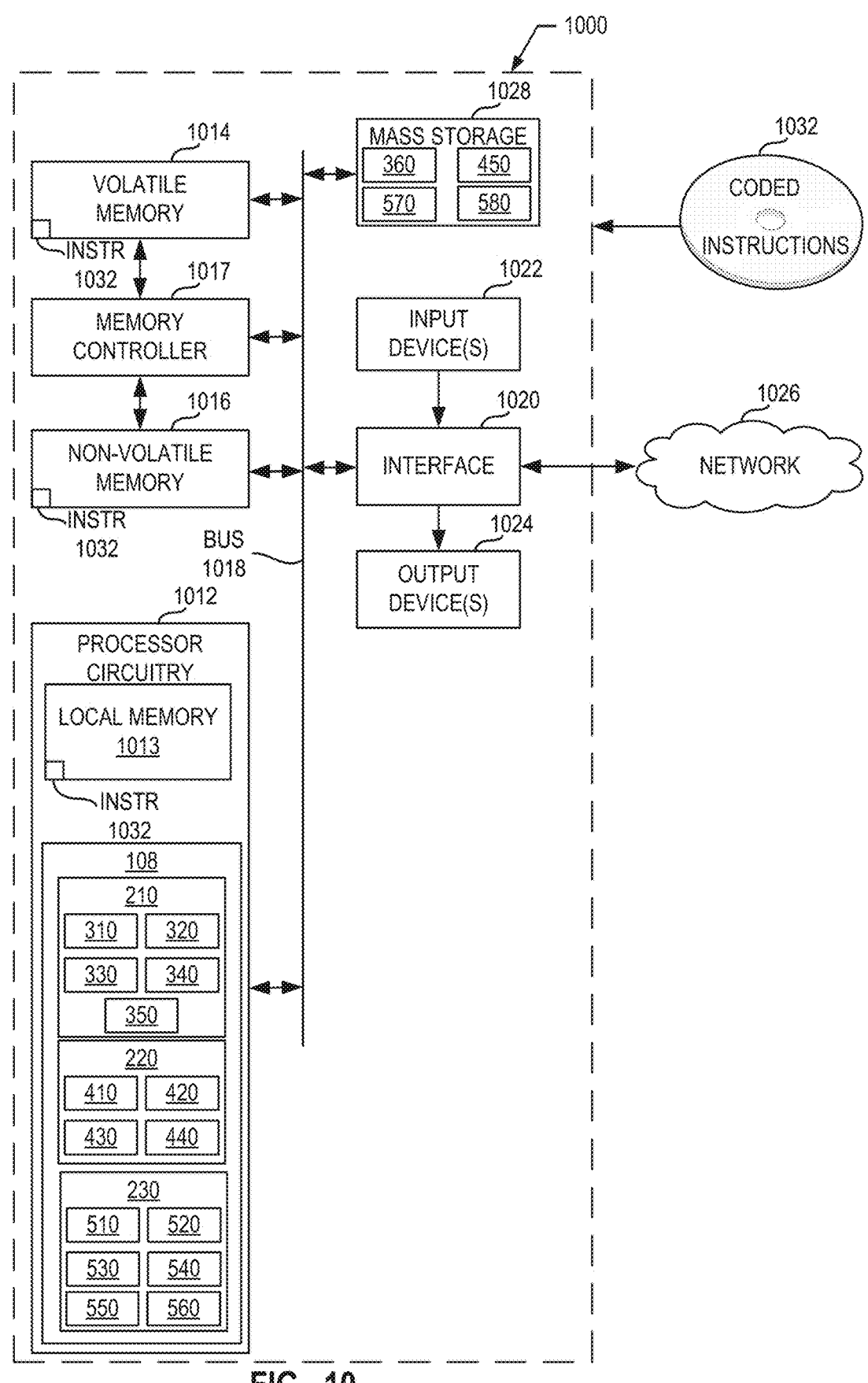
FIG. 10 is a block diagram of an example processing platform including processor circuitry structured to execute the example machine readable instructions and/or the example operations of FIGS. 7-9 to implement the example interruption circuitry of FIG. 2.

FIG. 10 is a block diagram of an example processor platform 1000 structured to execute and/or instantiate the machine readable instructions and/or the operations of FIGS. 7-9 to implement the interruption circuitry 108 of FIG. 2. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1000 of the illustrated example includes processor circuitry 1012. The processor circuitry 1012 of the illustrated example is hardware. For example, the processor circuitry 1012 can be implemented by one or more integrated circuits, logic circuits, FPGAs, microprocessors, CPUs, GPUs, DSPs, and/or microcontrollers from any desired family or manufacturer. The processor circuitry 1012 may be implemented by one or more semiconductor based (e.g., silicon based) devices. In this example, the processor circuitry 1012 implements the example interruption circuitry 108, the example interruption detection circuitry 210, the example interruption notification circuitry 220, the example interruption control circuitry 230, the example audio monitor circuitry 310, the example speaker detection circuitry 320, the example speaker indication circuitry 330, the example pause-in-speech duration setting circuitry 340, the example interruption trigger circuitry 350, the example host interruption notification circuitry 410, the example interrupter notification circuitry 420, the example speaker interruption notification circuitry 430, the example listener interruption notification circuitry 440, the example interruption settings circuitry 510, the example interrupter mute circuitry 520, the example interrupter audio record circuitry 530, the example interrupter recording presentation circuitry 540, the example audio spatialization circuitry 550, and the example interrupter audio delay circuitry 560.

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1022 are connected to the interface circuitry 1020. The input device(s) 1022 permit(s) a user to enter data and/or commands into the processor circuitry 1012. The input device(s) 1022 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1024 are also connected to the interface circuitry 1020 of the illustrated example. The output device(s) 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1032, which may be implemented by the machine readable instructions of FIGS. 7-9, may be stored in the mass storage device 1028, in the volatile memory 1014, in the non-volatile memory 1016, and/or on a removable non-transitory computer readable storage medium such as a CD or DVD. In this example, the mass storage device 1028 includes the example interruption control settings database 360, the example interruption tracking database 450, the example recording buffer 570, and the example recording queue 580.

Figure 11:
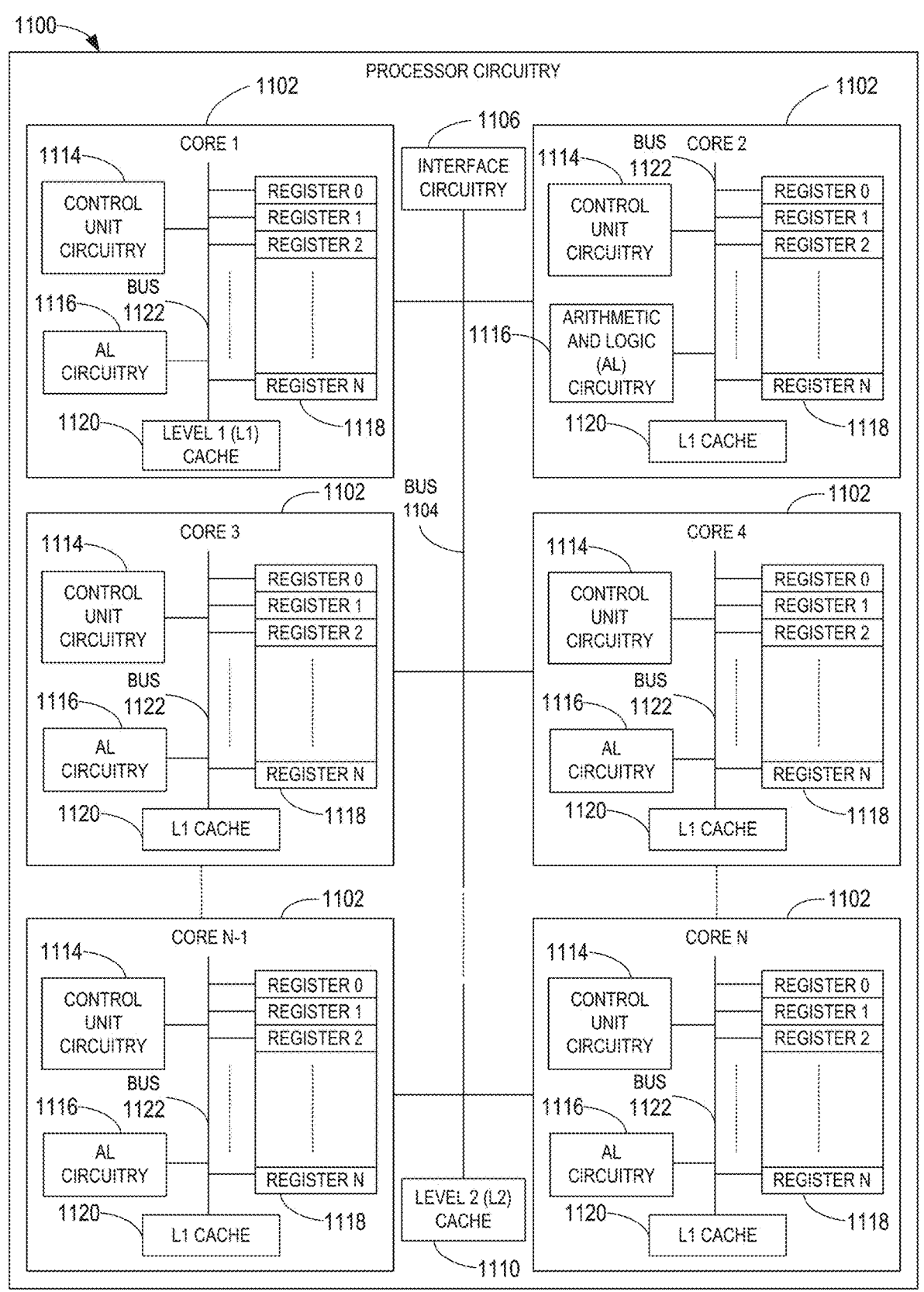
FIG. 11 is a block diagram of an example implementation of the processor circuitry of FIG. 10.

FIG. 11 is a block diagram of an example implementation of the processor circuitry 1012 of FIG. 10. In this example, the processor circuitry 1012 of FIG. 10 is implemented by a microprocessor 1100. For example, the microprocessor 1100 may be a general purpose microprocessor (e.g., general purpose microprocessor circuitry). The microprocessor 1100 executes some or all of the machine readable instructions of the flowcharts of FIGS. 7-9 to effectively instantiate the circuitry of FIG. 2 as logic circuits to perform the operations corresponding to those machine readable instructions. In some such examples, the circuitry of FIG. 2 is instantiated by the hardware circuits of the microprocessor 1100 in combination with the instructions. For example, the microprocessor 1100 may be implemented by multi-core hardware circuitry such as a CPU, a DSP, a GPU, an XPU, etc. Although it may include any number of example cores 1102 (e.g., 1 core), the microprocessor 1100 of this example is a multi-core semiconductor device including N cores. The cores 1102 of the microprocessor 1100 may operate independently or may cooperate to execute machine readable instructions. For example, machine code corresponding to a firmware program, an embedded software program, or a software program may be executed by one of the cores 1102 or may be executed by multiple ones of the cores 1102 at the same or different times. In some examples, the machine code corresponding to the firmware program, the embedded software program, or the software program is split into threads and executed in parallel by two or more of the cores 1102. The software program may correspond to a portion or all of the machine readable instructions and/or operations represented by the flowcharts of FIGS. 7-9.

The cores 1102 may communicate by a first example bus 1104. In some examples, the first bus 1104 may be implemented by a communication bus to effectuate communication associated with one(s) of the cores 1102. For example, the first bus 1104 may be implemented by at least one of an Inter-Integrated Circuit (I2C) bus, a Serial Peripheral Interface (SPI) bus, a PCI bus, or a PCIe bus. Additionally or alternatively, the first bus 1104 may be implemented by any other type of computing or electrical bus. The cores 1102 may obtain data, instructions, and/or signals from one or more external devices by example interface circuitry 1106. The cores 1102 may output data, instructions, and/or signals to the one or more external devices by the interface circuitry 1106. Although the cores 1102 of this example include example local memory 1120 (e.g., Level 1 (L1) cache that may be split into an L1 data cache and an L1 instruction cache), the microprocessor 1100 also includes example shared memory 1110 that may be shared by the cores (e.g., Level 2 (L2 cache)) for high-speed access to data and/or instructions. Data and/or instructions may be transferred (e.g., shared) by writing to and/or reading from the shared memory 1110. The local memory 1120 of each of the cores 1102 and the shared memory 1110 may be part of a hierarchy of storage devices including multiple levels of cache memory and the main memory (e.g., the main memory 1014, 1016 of FIG. 10). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1102 may be referred to as a CPU, DSP, GPU, etc., or any other type of hardware circuitry. Each core 1102 includes control unit circuitry 1114, arithmetic and logic (AL) circuitry (sometimes referred to as an ALU) 1116, a plurality of registers 1118, the local memory 1120, and a second example bus 1122. Other structures may be present. For example, each core 1102 may include vector unit circuitry, single instruction multiple data (SIMD) unit circuitry, load/store unit (LSU) circuitry, branch/jump unit circuitry, floating-point unit (FPU) circuitry, etc. The control unit circuitry 1114 includes semiconductor-based circuits structured to control (e.g., coordinate) data movement within the corresponding core 1102. The AL circuitry 1116 includes semiconductor-based circuits structured to perform one or more mathematic and/or logic operations on the data within the corresponding core 1102. The AL circuitry 1116 of some examples performs integer based operations. In other examples, the AL circuitry 1116 also performs floating point operations. In yet other examples, the AL circuitry 1116 may include first AL circuitry that performs integer based operations and second AL circuitry that performs floating point operations. In some examples, the AL circuitry 1116 may be referred to as an Arithmetic Logic Unit (ALU). The registers 1118 are semiconductor-based structures to store data and/or instructions such as results of one or more of the operations performed by the AL circuitry 1116 of the corresponding core 1102. For example, the registers 1118 may include vector register(s), SIMD register(s), general purpose register(s), flag register(s), segment register(s), machine specific register(s), instruction pointer register(s), control register(s), debug register(s), memory management register(s), machine check register(s), etc. The registers 1118 may be arranged in a bank as shown in FIG. 11. Alternatively, the registers 1118 may be organized in any other arrangement, format, or structure including distributed throughout the core 1102 to shorten access time. The second bus 1122 may be implemented by at least one of an I2C bus, a SPI bus, a PCI bus, or a PCIe bus Each core 1102 and/or, more generally, the microprocessor 1100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1100 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 12:
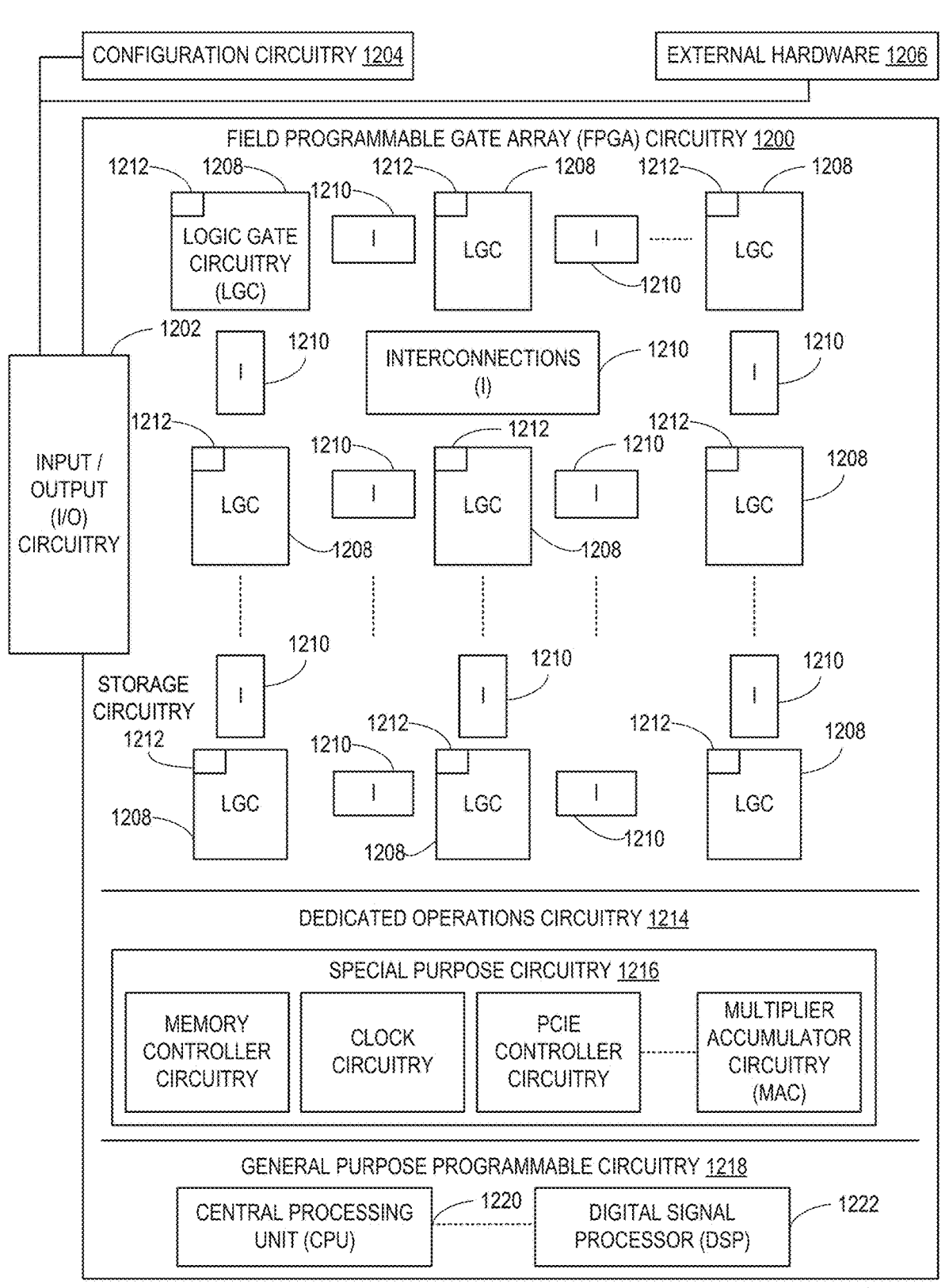
FIG. 12 is a block diagram of another example implementation of the processor circuitry of FIG. 10.

FIG. 12 is a block diagram of another example implementation of the processor circuitry 1012 of FIG. 10. In this example, the processor circuitry 1012 is implemented by FPGA circuitry 1200. For example, the FPGA circuitry 1200 may be implemented by an FPGA. The FPGA circuitry 1200 can be used, for example, to perform operations that could otherwise be performed by the example microprocessor 1100 of FIG. 11 executing corresponding machine readable instructions. However, once configured, the FPGA circuitry 1200 instantiates the machine readable instructions in hardware and, thus, can often execute the operations faster than they could be performed by a general purpose microprocessor executing the corresponding software.

More specifically, in contrast to the microprocessor 1100 of FIG. 11 described above (which is a general purpose device that may be programmed to execute some or all of the machine readable instructions represented by the flowcharts of FIGS. 7-9 but whose interconnections and logic circuitry are fixed once fabricated), the FPGA circuitry 1200 of the example of FIG. 12 includes interconnections and logic circuitry that may be configured and/or interconnected in different ways after fabrication to instantiate, for example, some or all of the machine readable instructions represented by the flowcharts of FIGS. 7-9. In particular, the FPGA circuitry 1200 may be thought of as an array of logic gates, interconnections, and switches. The switches can be programmed to change how the logic gates are interconnected by the interconnections, effectively forming one or more dedicated logic circuits (unless and until the FPGA circuitry 1200 is reprogrammed). The configured logic circuits enable the logic gates to cooperate in different ways to perform different operations on data received by input circuitry. Those operations may correspond to some or all of the software represented by the flowcharts of FIGS. 7-9. As such, the FPGA circuitry 1200 may be structured to effectively instantiate some or all of the machine readable instructions of the flowcharts of FIGS. 7-9 as dedicated logic circuits to perform the operations corresponding to those software instructions in a dedicated manner analogous to an ASIC. Therefore, the FPGA circuitry 1200 may perform the operations corresponding to the some or all of the machine readable instructions of FIGS. 7-9 faster than the general purpose microprocessor can execute the same.

In the example of FIG. 12, the FPGA circuitry 1200 is structured to be programmed (and/or reprogrammed one or more times) by an end user by a hardware description language (HDL) such as Verilog. The FPGA circuitry 1200 of FIG. 12, includes example input/output (I/O) circuitry 1202 to obtain and/or output data to/from example configuration circuitry 1204 and/or external hardware 1206. For example, the configuration circuitry 1204 may be implemented by interface circuitry that may obtain machine readable instructions to configure the FPGA circuitry 1200, or portion(s) thereof. In some such examples, the configuration circuitry 1204 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1206 may be implemented by external hardware circuitry. For example, the external hardware 1206 may be implemented by the microprocessor 1100 of FIG. 11. The FPGA circuitry 1200 also includes an array of example logic gate circuitry 1208, a plurality of example configurable interconnections 1210, and example storage circuitry 1212. The logic gate circuitry 1208 and the configurable interconnections 1210 are configurable to instantiate one or more operations that may correspond to at least some of the machine readable instructions of FIGS. 7-9 and/or other desired operations. The logic gate circuitry 1208 shown in FIG. 12 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1208 to enable configuration of the electrical structures and/or the logic gates to form circuits to perform desired operations. The logic gate circuitry 1208 may include other electrical structures such as look-up tables (LUTs), registers (e.g., flip-flops or latches), multiplexers, etc.

The configurable interconnections 1210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1208 to program desired logic circuits.

The storage circuitry 1212 of the illustrated example is structured to store result(s) of the one or more of the operations performed by corresponding logic gates. The storage circuitry 1212 may be implemented by registers or the like. In the illustrated example, the storage circuitry 1212 is distributed amongst the logic gate circuitry 1208 to facilitate access and increase execution speed.

The example FPGA circuitry 1200 of FIG. 12 also includes example Dedicated Operations Circuitry 1214. In this example, the Dedicated Operations Circuitry 1214 includes special purpose circuitry 1216 that may be invoked to implement commonly used functions to avoid the need to program those functions in the field. Examples of such special purpose circuitry 1216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1200 may also include example general purpose programmable circuitry 1218 such as an example CPU 1220 and/or an example DSP 1222. Other general purpose programmable circuitry 1218 may additionally or alternatively be present such as a GPU, an XPU, etc., that can be programmed to perform other operations.

Although FIGS. 5 and 6 illustrate two example implementations of the processor circuitry 1012 of FIG. 10, many other approaches are contemplated. For example, as mentioned above, modern FPGA circuitry may include an on-board CPU, such as one or more of the example CPU 1220 of FIG. 12. Therefore, the processor circuitry 1012 of FIG. 10 may additionally be implemented by combining the example microprocessor 1100 of FIG. 11 and the example FPGA circuitry 1200 of FIG. 12. In some such hybrid examples, a first portion of the machine readable instructions represented by the flowcharts of FIGS. 7-9 may be executed by one or more of the cores 1102 of FIG. 11, a second portion of the machine readable instructions represented by the flowcharts of FIGS. 7-9 may be executed by the FPGA circuitry 1200 of FIG. 12, and/or a third portion of the machine readable instructions represented by the flowcharts of FIGS. 7-9 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 1012 of FIG. 10 may be in one or more packages. For example, the microprocessor 1100 of FIG. 11 and/or the FPGA circuitry 1200 of FIG. 12 may be in one or more packages. In some examples, an XPU may be implemented by the processor circuitry 1012 of FIG. 10, which may be in one or more packages. For example, the XPU may include a CPU in one package, a DSP in another package, a GPU in yet another package, and an FPGA in still yet another package.

Figure 13:
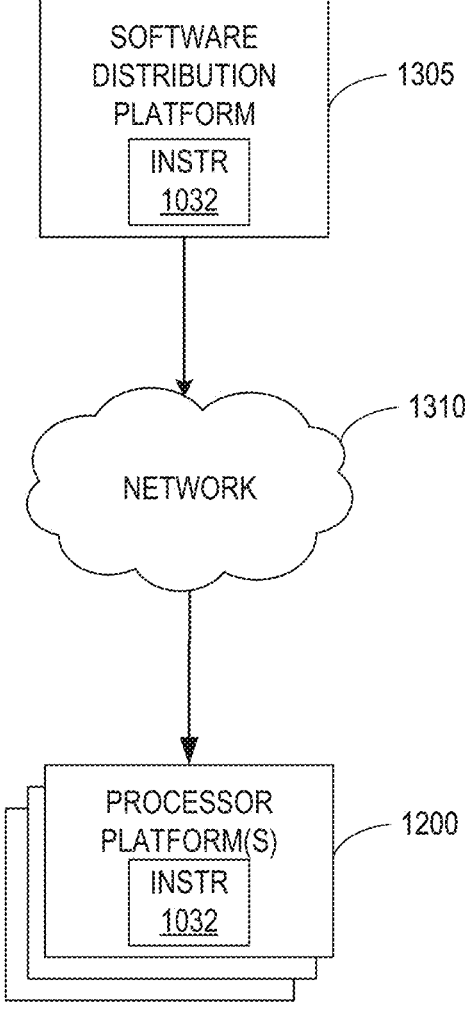
FIG. 13 is a block diagram of an example software distribution platform (e.g., one or more servers) to distribute software (e.g., software corresponding to the example machine readable instructions of FIGS. 7-9) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1305 to distribute software such as the example machine readable instructions 1032 of FIG. 10 to hardware devices owned and/or operated by third parties is illustrated in FIG. 13. The example software distribution platform 1305 may be implemented by any computer server, data facility, cloud service, etc., capable of storing and transmitting software to other computing devices. The third parties may be customers of the entity owning and/or operating the software distribution platform 1305. For example, the entity that owns and/or operates the software distribution platform 1305 may be a developer, a seller, and/or a licensor of software such as the example machine readable instructions 1032 of FIG. 10. The third parties may be consumers, users, retailers, OEMs, etc., who purchase and/or license the software for use and/or re-sale and/or sub-licensing. In the illustrated example, the software distribution platform 1305 includes one or more servers and one or more storage devices. The storage devices store the machine readable instructions 1032, which may correspond to the example machine readable instructions 700, 800, 900 of FIGS. 7-9, as described above. The one or more servers of the example software distribution platform 1305 are in communication with an example network 1310, which may correspond to any one or more of the Internet and/or any of the example networks 106, 1026 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1032 from the software distribution platform 1305. For example, the software, which may correspond to the example machine readable instructions 700, 800, 900 of FIGS. 7-9, may be downloaded to the example processor platform 1000, which is to execute the machine readable instructions 1032 to implement the interruption circuitry 108. In some examples, one or more servers of the software distribution platform 1305 periodically offer, transmit, and/or force updates to the software (e.g., the example machine readable instructions 1032 of FIG. 10) to ensure improvements, patches, updates, etc., are distributed and applied to the software at the end user devices.

From the foregoing, it will be appreciated that example systems, methods, apparatus, and articles of manufacture have been disclosed that facilitate multi-participant conversation. Disclosed systems, methods, apparatus, and articles of manufacture improve the efficiency of using a computing device by reducing audio processing to be performed in situations where processing and presenting the audio would be inefficient and unproductive. Specifically, the disclosed systems, methods, apparatus, and articles of manufacture prevent at least some computing devices participating in a virtual meeting from receiving audio that is unlikely to be heard and understood and, thus, reduces processing resources utilized by such computing devices as a result of the virtual meeting. In turn, the disclosed systems, methods, apparatus, and articles of manufacture help such computing devices avoid overburdening respective processing resources such that the processing bandwidth of the computing devices is not overrun by audio processing as a result of frequent interruptions during a virtual meeting. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to facilitate multi-participant conversation are disclosed herein. Further examples and combinations thereof include the following:

Example 1 includes an apparatus to control interruptions comprising at least one memory, machine readable instructions, and processor circuitry to at least one of instantiate or execute the machine readable instructions to detect first audio from a first user device, detect second audio from a second user device, determine the second detected audio is an interruption attempt in response to a start of the second detected audio being received during a presentation time of the first detected audio, render an interruption notification to the second user device, and control a manner of rendering the second detected audio based on interruption control settings.

Example 2 includes the apparatus of example 1, wherein, to control the second detected audio, the processor circuitry is to at least one of instantiate or execute the machine readable instructions to cause the second detected audio to be muted.

Example 3 includes the apparatus of example 1, wherein the processor circuitry is to at least one of instantiate or execute the machine readable instructions to capture a recording of the second detected audio during the interruption.

Example 4 includes the apparatus of example 3, wherein the processor circuitry is to at least one of instantiate or execute the machine readable instructions to audibly present the recording in response to the presentation time of the first detected audio ending.

Example 5 includes the apparatus of example 3, wherein the processor circuitry is to at least one of instantiate or execute the machine readable instructions to generate text based on the recording, and present the text to at least one of the first user device or a third user device.

Example 6 includes the apparatus of example 3, wherein the processor circuitry is to at least one of instantiate or execute the machine readable instructions to prompt the second user device to indicate whether the recording is to be presented, and in response to the second user device indicating the recording is not to be presented, delete the recording.

Example 7 includes the apparatus of example 3, wherein the processor circuitry is to at least one of instantiate or execute the machine readable instructions to prompt the second user device to indicate whether the recording is to be presented, in response to the second user device indicating the recording is to be presented, determine a format in which the recording is to be presented, and present the recording based on the determined format.

Example 8 includes the apparatus of example 1, wherein, to control the second detected audio, the processor circuitry is to at least one of instantiate or execute the machine readable instructions to at least one of spatialize or delay the second detected audio.

Example 9 includes the apparatus of example 1, wherein, to control the second detected audio, the processor circuitry is to at least one of instantiate or execute the machine readable instructions to determine whether to at least one of spatialize, delay, or mute the second detected audio based on the interruption control settings selected at a host device.

Example 10 includes the apparatus of example 1, wherein the processor circuitry is to at least one of instantiate or execute the machine readable instructions to in response to detecting the first detected audio present a first visual indication in a first location associated with the first user device, the first visual indication representative of permission to speak, present a second visual indication in a second location associated with the second user device, the second visual indication representative of not having the permission to speak, and in response to the first detected audio ending, present the first visual indication in the second location.

Example 11 includes the apparatus of example 1, wherein the processor circuitry is to at least one of instantiate or execute the machine readable instructions to determine the presentation time associated with the first user device is concluded in response to detecting a gap in the first detected audio having a duration that is greater than a threshold period.

Example 12 includes the apparatus of example 11, wherein the processor circuitry is to at least one of instantiate or execute the machine readable instructions to set the threshold period based on at least one of (i) a geographic location of at least one of the first user device or the second user device, (ii) an organization associated with at least one of the first user device or the second user device, or (iii) previously encountered pauses in at least one of the first detected audio or the second detected audio.

Example 13 includes the apparatus of example 1, wherein the interruption is in a virtual meeting.

Example 14 includes the apparatus of example 13, wherein the interruption notification is a first interruption notification, and, in response to determining the second user device caused the interruption, the processor circuitry is to at least one of instantiate or execute the machine readable instructions to render a second interruption notification to a host device in the virtual meeting, the second interruption notification including user information associated with the second user device, the second interruption notification different from the first interruption notification.

Example 15 includes a method comprising detecting, by executing an instruction with processor circuitry, an interruption event in response to second detected audio from a first user device being encountered during a first playback of first detected audio from a second user device, and in response to detecting the interruption event providing, by executing an instruction with processor circuitry, an interruption notification to the first user device, and adjusting, by executing an instruction with processor circuitry, a second playback of the second detected audio from the first user device.

Example 16 includes the method of example 15, wherein adjusting the second playback of the second detected audio includes muting the second playback of the second detected audio, and recording the second detected audio for a subsequent presentation.

Example 17 includes the method of example 16, further including causing, by executing an instruction with the processor circuitry, the recording of the second detected audio to be presented in response to the first playback of the first detected audio concluding.

Example 18 includes the method of example 17, wherein the first playback of the first detected audio concludes in response to the first detected audio not being sensed for at least a threshold duration.

Example 19 includes the method of example 16, further including causing, by executing an instruction with the processor circuitry, the subsequent presentation of the second detected audio to occur in at least one of a text format or an audio format.

Example 20 includes the method of example 15, wherein adjusting the second playback of the second detected audio includes spatializing the second playback of the second detected audio.

Example 21 includes the method of example 15, wherein adjusting the second playback of the second detected audio includes muting the second playback of the second detected audio, transcribing the second detected audio, and rendering text corresponding to the transcribed second detected audio to at least one of the second user device or a third user device.

Example 22 includes the method of example 15, wherein the first user device and the second user device are participants in a virtual meeting.

Example 23 includes a non-transitory machine readable storage medium comprising instructions that, when executed, cause processor circuitry to at least detect first audio sensed at a first user device, detect second audio sensed at a second user device, determine the second detected audio is an interruption in response to an initiation of the second detected audio occurring during a playback of the first detected audio, cause an interruption notification to be displayed at the second user device, and control the second detected audio based on interruption control settings associated with the second user device.

Example 24 includes the non-transitory machine readable storage medium of example 23, wherein, to control the second detected audio, the instructions, when executed, cause the processor circuitry to determine whether to spatialize the second detected audio, delay the second detected audio, or mute the second detected audio based on the interruption control settings.

Example 25 includes the non-transitory machine readable storage medium of example 23, wherein the first user device and the second user device are participants in a virtual meeting.

Example 26 includes an apparatus comprising means for detecting an interruption attempt in response to second detected audio from a first user device being detected during playback of first detected audio from a second user device, means for rendering an interruption notification to the first user device in response to the interruption being detected, and means for adjusting a playback of the second detected audio from the first user device in response to the interruption being detected.

Example 27 includes the apparatus of example 26, wherein the first user device and the second user device are participant devices in a virtual meeting. The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to control interruptions comprising:
at least one memory;
machine readable instructions; and
at least one processor circuitry circuit to be programmed by the machine readable instructions to:
  detect first audio from a first user device;
  detect second audio from a second user device;
  determine the second audio is an interruption attempt in response to a start of the second audio occurring during a presentation time of the first audio;
  generate text based on a recording of the second audio;
  prompt the second user device with (a) the text and (b) presentation instructions associated with the recording; and
  based on a response to the presentation instructions at least one of: render the text, audibly present the second audio, or delete the second audio.

2. The apparatus of claim 1, wherein one or more of the at least one processor circuit is to cause the second audio to be muted.

3. The apparatus of claim 1, wherein one or more of the at least one processor circuit is to capture the recording of the second audio during the interruption attempt.

4. The apparatus of claim 3, wherein one or more of the at least one processor circuit is to audibly present the recording in response to an end of the presentation time of the first audio.

5. The apparatus of claim 3, wherein one or more of the at least one processor circuit is to:
  generate the text based on the recording; and
  render the text to at least one of the first user device or a third user device.

6. The apparatus of claim 1, wherein one or more of the at least one processor circuit is to at least one of spatialize or delay presentation of the second detected-audio.

7. The apparatus of claim 1, wherein one or more of the at least one processor circuit is to determine whether to at least one of spatialize, delay, or mute the second audio based on interruption control settings selected at a host device.

8. The apparatus of claim 1, wherein one or more of the at least one processor circuit is to:
  in response to detecting the first audio:
    render a first visual indication in a first location associated with the first user device, the first visual indication representative of permission to speak;
    render a second visual indication in a second location associated with the second user device, the second visual indication representative of not having the permission to speak; and
  in response to an end of the first detected audio ending, render the first visual indication in the second location.

9. The apparatus of claim 1, wherein one or more of the at least one processor circuit is to determine an end of presentation time associated with the first user device based on a gap in the first audio, the gap associated with a duration that is greater than a threshold.

10. The apparatus of claim 9, wherein one or more of the at least one processor circuit is to set the threshold based on at least one of (i) a geographic location of at least one of the first user device or the second user device, (ii) an organization associated with at least one of the first user device or the second user device, or (iii) previously encountered pauses in at least one of the first audio or the second audio.

11. The apparatus of claim 1, wherein the interruption attempt is in a virtual meeting.

12. The apparatus of claim 11, wherein, in response to determining the second user device caused the interruption attempt, one or more of the at least one processor circuit is to render an interruption notification to a host device in the virtual meeting, the interruption notification including user information associated with the second user device.

13. The apparatus of claim 1, wherein, to audibly present the second audio, one or more of the at least one processor circuit is to cause the first audio and the second audio to be spatialized at a third user device.

14. The apparatus of claim 1, wherein one or more of the at least one processor circuit is to:
  determine a threshold duration to associate with an end of the first audio based on a geographic location of the first user device; and
  identify the end of the first audio in response to the first audio not being sensed at the first user device for the threshold duration.

15. The apparatus of claim 1, wherein one or more of the at least one processor circuit is to determine a threshold duration to associate with a conclusion of the first audio based on at least one of (i) a geographic location of at least one of the first user device or the second user device, (ii) an organization associated with at least one of the first user device or the second user device, or (iii) previously encountered pauses in at least one of the first audio or the second audio.

16. A method comprising:
  detecting, by executing an instruction with at least one processor, an interruption event in response to second audio from a first user device being encountered during a first playback of first audio from a second user device; and
  in response to detecting the interruption event:
    generating, by one or more of the at least one processor circuit, text based on a recording of the second audio;

prompting, by one or more of the at least one processor circuit, the first user device with (a) the text and (b) presentation instructions associated with the recording; and at least one of (a) rendering, by one or more of the at least one processor circuit, the text, (b) audibly presenting, by one or more of the at least one processor circuit, a second playback of the second audio from the first user device, or (c) deleting, by one or more of the at least one processor circuit, the second audio based on a response to the presentation instructions.

17. The method of claim 16, wherein the method includes: muting the second playback of the second audio; and recording the second audio for a subsequent presentation.

18. The method of claim 17, further including causing the recording of the second audio to be presented in response to the first playback of the first audio concluding.

19. The method of claim 18, wherein the first play back of the first audio concludes in response to the first audio not being sensed for at least a threshold duration.

20. The method of claim 16, wherein adjusting audibly presenting the second playback of the second audio includes spatializing the second playback of the second detected-audio.

21. The method of claim 16, wherein rendering the text includes:

muting the second playback of the second audio;

transcribing the second audio; and rendering the text corresponding to the transcribed second audio to at least one of the second user device or a third user device.

22. The method of claim 16, wherein the first user device and the second user device are participants in a virtual meeting.

23. At least one non-transitory machine readable storage medium comprising instructions to cause at least one processor circuit to at least:

obtain first audio sensed at a first user device;

obtain second audio sensed at a second user device;

determine the second audio is an interruption in response to an initiation of the second audio occurring during the first audio;

generate text based on a recording of the second audio;

prompt the second user device with (a) the text and (b) presentation instructions associated with the recording; and at least one of render the text, audibly present the second audio, or delete the second audio based on a response to the presentation instructions.

24. The non-transitory machine readable storage medium of claim 23, wherein the instructions cause one or more of the at least one processor circuit to determine whether to spatialize the second audio, delay the second audio, or mute the second audio based on interruption control settings.

25. The non-transitory machine readable storage medium of claim 23, wherein the first user device and the second user device are participants in a virtual meeting.

26. An apparatus comprising:

means for detecting an interruption attempt in response to second audio from a first user device being detected during playback of first audio from a second user device;

means for adjusting a playback or presentation of audio to generate text based on a recording of the second audio;

prompt the first user device in response to the interruption attempt being detected with (a) the text and (b) presentation instructions associated with the recording; and at least one of (a) render the text, (b) audibly present a playback of the second audio from the first user device, or (c) delete the second audio based on a response to the presentation instructions.

27. The apparatus of claim 26, wherein the first user device and the second user device are participant devices in a virtual meeting.

* * * * *